US012401519B2

(12) United States Patent
Ammar et al.

(10) Patent No.: US 12,401,519 B2
(45) Date of Patent: Aug. 26, 2025

(54) ELECTRONIC DOCUMENT SIGNATURES

(71) Applicant: nChain Licensing AG, Zug (CH)

(72) Inventors: Bassem Ammar, London (GB); Wei Zhang, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 258 days.

(21) Appl. No.: 18/011,083

(22) PCT Filed: Jun. 3, 2021

(86) PCT No.: PCT/EP2021/064909
§ 371 (c)(1),
(2) Date: Dec. 16, 2022

(87) PCT Pub. No.: WO2022/002526
PCT Pub. Date: Jan. 6, 2022

(65) Prior Publication Data
US 2023/0231725 A1 Jul. 20, 2023

(30) Foreign Application Priority Data
Jul. 2, 2020 (GB) ..................................... 2010177

(51) Int. Cl.
*H04L 9/32* (2006.01)
*G06F 21/60* (2013.01)
(Continued)

(52) U.S. Cl.
CPC .......... *H04L 9/3247* (2013.01); *G06F 21/602* (2013.01); *G06F 21/64* (2013.01); *H04L 9/30* (2013.01)

(58) Field of Classification Search
CPC .. G06Q 20/3829; G06Q 20/02; G06Q 20/065; G06Q 20/3678; G06Q 20/3827;
(Continued)

(56) References Cited

U.S. PATENT DOCUMENTS

2017/0005804 A1* 1/2017 Zinder .................. H04L 9/3239
2017/0220815 A1* 8/2017 Ansari .................... G06F 21/64
(Continued)

FOREIGN PATENT DOCUMENTS

JP 2013192125 A 9/2013
JP 2019512808 A 5/2019
JP 2019514089 A 5/2019

OTHER PUBLICATIONS

Compliancy Group, "GDPR Compliance and HIPAA: How to Address Both," Retrieved from the Internet: URL: https://compliancy-group.com/gdpr-compliance-hipaa-software/, on Dec. 4, 2019, 5 pages.
(Continued)

*Primary Examiner* — Christopher C Harris
(74) *Attorney, Agent, or Firm* — Messner Reeves LLP

(57) ABSTRACT

According to a first aspect, there is provided a computer-implemented method of cryptographically linking multiple documents, having multiple electronic signature requirements, via a sequence of blockchain transactions, the method comprising: computing document signature data satisfying a first signature requirement for an existing document, the first signature requirement defined in a blockchain transaction containing or referencing the existing document; wherein the document signature data signs a portion of a linking transaction containing or referencing a supplementary document, the linking transaction comprising an input for validly spending a spendable output of the blockchain transaction, whereby the document signature cryptographically links the supplementary document with the existing document; and wherein the signed portion comprises multiple outputs of the linking transaction; wherein a first of the multiple signed outputs is spendable and associated with the existing document, the signed portion defining a second signature requirement for the existing document; and
(Continued)

wherein a second of the multiple signed outputs is spendable and associated with the supplementary document, the signed portion defining a signature requirement for the supplementary document.

20 Claims, 11 Drawing Sheets

(51) Int. Cl.
*G06F 21/64* (2013.01)
*H04L 9/30* (2006.01)

(58) Field of Classification Search
CPC ............. G06Q 20/389; G06Q 2220/00; G06Q 2220/12; G06F 16/1834; G06F 16/27; G06F 21/602; G06F 21/64; H04L 2209/56; H04L 9/321; H04L 9/3247; H04L 9/50; H04L 9/0637; H04L 9/0643; H04L 9/0836; H04L 9/0861; H04L 9/0891; H04L 9/30; H04L 9/3066; H04L 9/3234; H04L 9/3236; H04L 9/3239; H04L 9/3242
See application file for complete search history.

(56) References Cited

U.S. PATENT DOCUMENTS

| | | | | |
|---|---|---|---|---|
| 2018/0158035 | A1 | 6/2018 | Kaufmann et al. | |
| 2019/0057362 | A1 | 2/2019 | Wright et al. | |
| 2019/0057382 | A1 | 2/2019 | Wright et al. | |
| 2019/0205873 | A1* | 7/2019 | Kamalsky | H04L 9/3239 |
| 2020/0394651 | A1* | 12/2020 | Kreder, III | G06Q 20/22 |
| 2021/0097528 | A1* | 4/2021 | Wang | H04L 9/30 |
| 2021/0182895 | A1* | 6/2021 | Sears | G06Q 20/367 |
| 2021/0266167 | A1* | 8/2021 | Lohe | G06Q 20/10 |
| 2021/0320806 | A1* | 10/2021 | Boudreault | H04L 9/3242 |
| 2021/0334176 | A1* | 10/2021 | Sears | G06F 21/602 |

OTHER PUBLICATIONS

Eker O., "Parties on a Bill of Lading: Shipper, Consignee, Notify Party and Carrier," Letter of Credit, Apr. 3, 2019, Retrieved from the Internet: URL: https://www.letterofcredit.biz/index.php/2019/04/03/parties-on-a-bill-of-lading-shipper-consignee-notify-party-and-carrier/, 5 pages.

Eker O., "To Order and Blank Endorsed Bill of Lading," Letter of Credit, Feb. 25, 2019, retrieved from the Internet: URL: https://www.letterofcredit.biz/index.php/2019/02/25/to-order-and-blank-endorsed-bill-of-lading/, 2 pages.

Export Import Terms, "Difference between Airway Bill and Bill of Lading," Jun. 1, 2022, Retrieved from the Internet: URL: https://howtoexportimport.com/Difference-between-Airway-Bill-and-Bill-of-Lading--467.aspx, 2 pages.

Holman G.K., "What is UBL?," UBL Vocabulary, Jan. 1, 2017, retrieved from the Internet: URL: https://www.xml.com/articles/2017/01/01/what-is-ubl/, on Dec. 4, 2019, 28 pages.

Kagan J., "Letter of Credit: What It Is, Examples, and How One Is Used," Investopedia, Oct. 19, 2021, retrieved from the Internet: URL: https://www.investopedia.com/terms/l/letterofcredit.asp, 8 pages.

Kenton W., "Air Waybill (AWB) Definition: What It Is and How to Get One," Investopedia, Mar. 19, 2022, Retrieved from the Internet: URL: https://www.investopedia.com/terms/a/airway-bill.asp, 3 pages.

Kuester F., "Electronic Bill of Lading—How is Paperless Trade Possible?," Combined Transport Magazine, Digitalization, Feb. 9, 2017, retrieved from the Internet: URL: https://combined-transport.eu/electronic-bill-of-lading, 3 pages.

Oasis, "Universal Business Language Version 2.1," Oasis Standard, Nov. 4, 2013, retrieved from the Internet: URL: http://docs.oasis-open.org/ubl/os-UBL-2.1/UBL-2.1.html, on Dec. 4, 2019, 218 pages.

Oasis, "Universal Business Language Version 2.1," Oasis Standard, Nov. 4, 2013, retrieved from the Internet: URL: http://docs.oasis-open.org/ubl/UBL-2.1.html, 144 pages.

Raunek., "Bill of Lading in Shipping: Importance, Purpose, and Types," Marine in Sight, Jul. 28, 2022, Retrieved from the Internet: URL: https://www.marineinsight.com/maritime-law/what-is-bill-of-lading-in-shipping/, 30 pages.

Shipping Solutions, "What is a SLI in NCBFAA Format?," retrieved from the Internet: URL: https://www.shippingsolutions.com/sli-in-ncbfaa-format, on Dec. 4, 2019, 3 pages.

The Wayback Machine, "Negotiability," Definition, retrieved from the Internet: URL: https://web.archive.org/web/20191202063156/http://www.businessdictionary.com/definition/negotiability.html, on Dec. 4, 2019, 1 page.

PCT/EP2021/064909 International Search Report and Written Opinion dated Aug. 20, 2021, 14 pages.

Copigneaux Bertrand et al: "Blockchain for supply chains and international trade", May 31, 2020 (May 31, 2020), pp. 1-172, XP055819944, Retrieved from the Internet: URL:https://www.europarl.europa.eu/RegData/etudesSTUD/2020/641544/EPRS_STU(2020)641544EN.pdf [retrieved on Jun. 30, 2021] p. 124-128.

Ganne Emmanuelle: Can blockchain revolutionize international trade?, Dec. 31, 2018 (Dec. 31, 2018), pp. 1-163, XP055819956, ISBN: 978-92-8-704761-8, Retrieved from the Internet:URL:https://www.wto.org/english/res-e/booksp_e/blockchainrev18_e.pdf, [retrieved on Jun. 30, 2021], p. 17-p. 37.

GB2010177.0 Combined Search and Examination Report dated Dec. 11, 2020, 8 pages.

* cited by examiner

<table>
<tr><td></td><td colspan="5">$TxID_n$</td><td></td></tr>
<tr><td></td><td colspan="2">Version 1</td><td colspan="3">Locktime 0</td><td></td></tr>
<tr><td></td><td colspan="2">In-count 2</td><td colspan="3">Out-count 4</td><td></td></tr>
<tr><td></td><td colspan="2">Input List</td><td colspan="3">Output List</td><td></td></tr>
<tr><td></td><td>Outpoint</td><td>Unlocking Script</td><td>Value</td><td colspan="2">Locking Script</td><td></td></tr>
<tr><td></td><td></td><td></td><td></td><td>OP_PUSHDATA</td><td>P2PKH</td><td></td></tr>
<tr><td>506a</td><td>$TxID_{n-1}$||α</td><td>[linkable signature of authorised actor SIGHASH_ALL]</td><td>x satoshi</td><td><Document$_X$>|| <state></td><td><$P_{next1}$></td><td>504a</td></tr>
<tr><td>506b</td><td>$TxID_{n-2}$||β</td><td>[linkable signature of authorised actor SIGHASH_SINGLE]</td><td>x satoshi</td><td><Ref$_{DocY}$>|| <state></td><td>Multi-sign 2 of 2 <$P_{next2}$ $P_{next3}$></td><td>504b</td></tr>
<tr><td></td><td></td><td></td><td>x satoshi</td><td><Ref$_{DocZ}$>|| <state></td><td><$P_{next4}$></td><td>504c</td></tr>
<tr><td></td><td></td><td></td><td>x satoshi</td><td><Document$_A$>|| <state></td><td>Multi-sign 1 of 2 <$P_{next5}$ $P_{next6}$></td><td>504d</td></tr>
</table>

Don't think we need to access previous transaction or maybe need 4 – check with TDW

ELECTRONIC DOCUMENT SIGNATURES

CROSS REFERENCE TO RELATED APPLICATIONS

This application is the U.S. National Stage of International Application No. PCT/EP2021/064909 filed on Jun. 3, 2021, which claims the benefit of United Kingdom Patent Application No. 2010177.0, filed on Jul. 2, 2020, the contents of which are incorporated herein by reference in their entireties.

TECHNICAL FIELD

The present disclosure relates to electronic document signatures, and in particular to systems and methods for applying cryptographically verifiable digital signatures to multiple interrelated documents, having multiple signature requirements that change over time, and robustly recording those signatures.

BACKGROUND

Documents often need to be signed by actors, for example to authorise the document or as a confirmation of agreement or receipt. Traditionally, hard copies of the document are signed and sent, if necessary, either by post or electronically. More recently, electronic signatures, or e-signatures, have become more prevalent. E-signatures allow actors to sign document electronically, without the actor needing to acquire a hard copy of the document.

There are a number of different types of signature that could be loosely described as "electronic". These include a scanned image of an entity's signature, a hand-signature generated on a tablet or other electronic writing device, a typed name, a video signature, and a checkbox which the entity checks to show agreement. Such signatures may comprise additional information, such as a timestamp indicating the time at which the actor provided their signature and/or a location of the actors at the time of signing.

By contrast, digital signatures that leverage the principles of modern cryptography are far more reliable and secure. Digital signatures are a cryptographic mechanism for employing electronic signatures and, unless otherwise indicated, references herein to electronic signatures, document signatures and the like refer to digital signatures in this sense. The presence of a valid signature gives a receipt of the signed document assurance that the document has been sent by a known sender and has not been altered in transit. Digital signatures are, therefore, frequently used in cases where detecting forgery or tampering are important.

Digital signatures schemes use private and public keys of actors to sign documents and validate signatures, the two keys being cryptographically linked. A private key is used to generate a signature which is verifiable by anyone in possession of the corresponding public key. The signature is usually generated based on a cryptographic hash of a document to be signed. If the document is altered after signing, it will no longer match the cryptographic hash of the signature, and the signature will therefore be invalid in respect of the altered document.

It is practically impossible to forge a signature without having access to the signer's private key. Therefore, digital signatures can provide non-repudiation, meaning that the singer cannot successfully claim to have not provided their signature whilst also claiming their private key is still secret. That is, either the private key is no longer secret such that the signature was provided by a third party who now has access to the secret key, or the signer provided their signature.

SUMMARY

There is little doubt that the strong cryptographic mechanisms that underpin digital signatures make them more secure than traditional document signatures. However, a barrier to more widespread use of digital signatures for document signing is the lack of similarly robust systems for tracking and recording electronic signatures applied to documents.

This is exacerbated when the signature requirements of a document change during the life of the document, and/or when documents need to be amended or updated. For example, an actor authorised to sign the document may change at different points in the document's lifespan. Who is authorised may depend on any number of factors. There may be, for example, a sequential list of actors who are authorised to sign, such that an actor can only sign the document if the actor before them in the list has already signed it. Another example is that an actor is only authorised to sign if they, or another actor, has performed a specific task.

This is complicated further if there is a need to link multiple signed documents. For example, it may be that, when a particular actor applies a signature to an initial document, that is contingent on one or more supplementary documents. Such supplementary documents won't necessarily have existed at the time the initial document was created, so this requires the ability to link different documents at different times, i.e. not limited to linking documents at the time they are created.

It would therefore be desirable to provide a document signing technology that can facilitate more complex signature requirements. In particular, it would be desirable to provide systems and methods for applying cryptographically verifiable digital signatures to multiple interrelated documents, that may be created at different points in time, and which have multiple signature requirements that change over time and must be fulfilled by multiple parties in a particular order. Further, it would be desirable to provide a system for robustly recording the same in a manner that ensures consistency between all parties.

The present disclosure recognises that a blockchain data structure provides an ideal framework for implementing the requirements set out above. A blockchain provides a sequential record of transactions, with each new blockchain transaction recorded to a blockchain is conditional on certain requirements being met. Herein, the sequential nature of the blockchain data structure is utilized to add new signature requirements, to existing documents, that must be fulfilled in a particular order. Document signature requirements are defined in spendable outputs of blockchain transaction and, at the same time as defining new signature requirements, multiple documents can be liked together in a cryptographically verifiable manner via liking transactions having multiple spendable outputs.

According to one aspect disclosed herein, there is provided a computer-implemented method of cryptographically linking multiple documents, having multiple electronic signature requirements, via a sequence of blockchain transactions, the method comprising: computing document signature data satisfying a first signature requirement for an existing document, the first signature requirement defined in a blockchain transaction containing or referencing the existing document; wherein the document signature data signs a portion of a linking transaction containing or referencing a supplementary document, the linking transaction comprising an input for validly spending a spendable output of the blockchain transaction, whereby the document signature cryptographically links the supplementary document with the existing document; and wherein the signed portion comprises multiple outputs of the linking transaction, wherein a first of the multiple signed outputs is spendable and associated with the existing document, the signed portion defining a second signature requirement for the existing document, and wherein a second of the multiple signed outputs is spendable and associated with the supplementary document, the signed portion defining a signature requirement for the supplementary document.

According to a second aspect disclosed herein, there is provided a linking transaction for a blockchain, the linking transaction comprising an input for validly spending a spendable output of a blockchain transaction containing or referencing an existing document, and multiple outputs; wherein document signature data signs a portion of the linking transaction containing or referencing a supplementary document, whereby the document signature cryptographically links the supplementary document with the existing document; and wherein a signed portion comprises multiple outputs of the linking transaction, wherein a first of the multiple signed outputs is spendable and associated with the existing document, the signed portion defining a second signature requirement for the existing document, and wherein a second of the multiple signed outputs is spendable and associated with the supplementary document, the signed portion defining a signature requirement for the supplementary document.

Within this framework, it is also possible to facilitate changes to the content or status of the documents, in a way that is verifiable. For example, embodiments of the present invention admit status changes through status flags included in the signed transaction(s). In this context, the sequential nature of the blockchain data structure is not only utilized as a way to define and fulfil complex document signature requirements, but also provides an immutable and consistent record of the complete history of any changes to the content and/or status of the signed documents.

Embodiments of the technology leverage transaction verifications mechanisms used to secure the blockchain to additionally provide an additional document signature verification function. In that case, the document signatures take the form of transaction signatures for validating transactions, and in particular for validating spending relationships between transactions. This has the benefit that the existing work performed by node to validate blockchain transactions also assists in the verification of the document signature requirements.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Example System Overview

Figure 1:
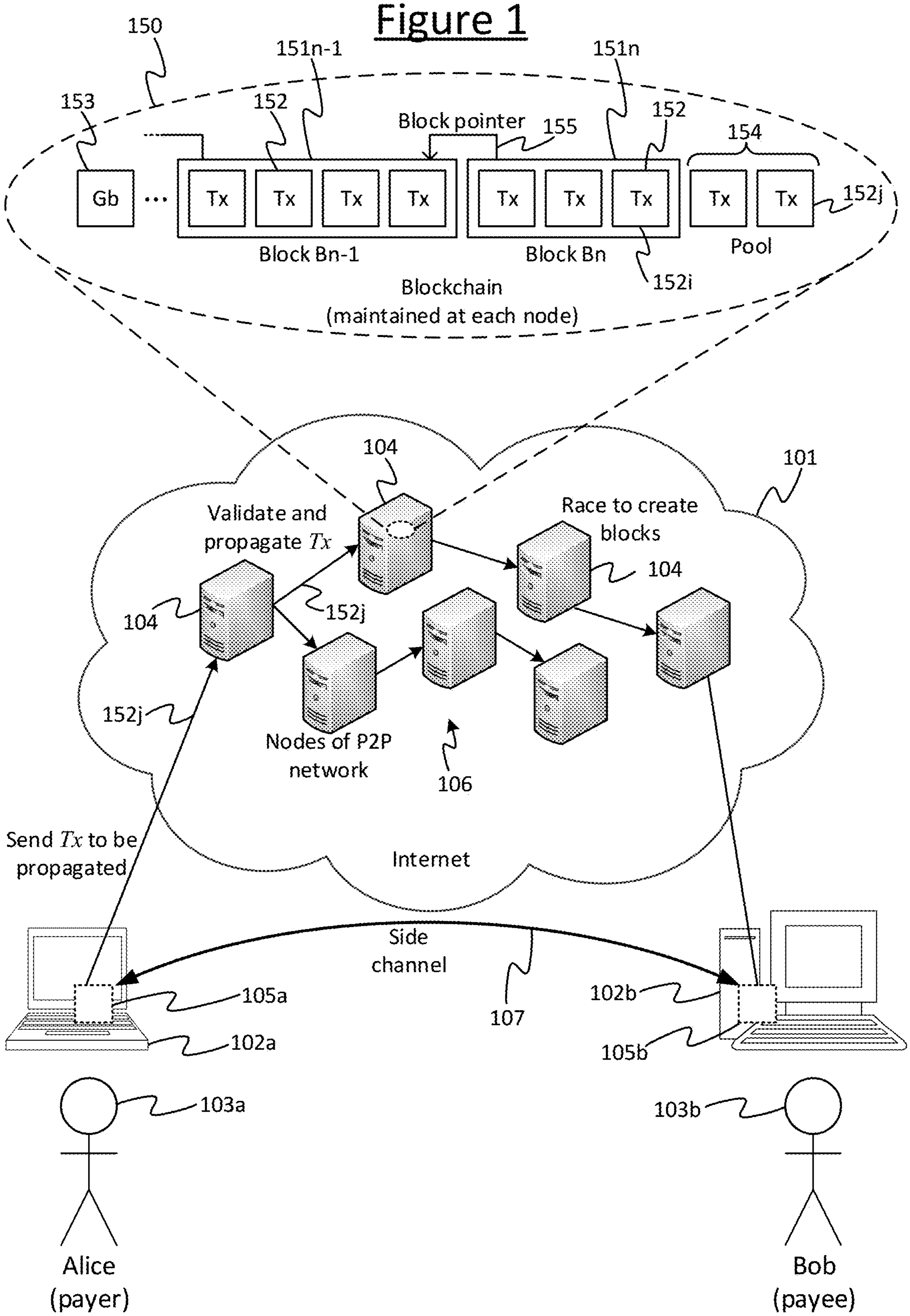
FIG. 1 is a schematic block diagram of a system for implementing a blockchain, FIG. 2 schematically illustrates some examples of transactions which may be recorded in a blockchain.

A blockchain refers to a form of distributed data structure, wherein a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used to for one or more of the following purposes: to convey a digital asset (i.e. a number of digital tokens), to order a set of entries in a virtualised ledger or registry, to receive and process timestamp entries, and/or to time-order index pointers. A blockchain can also be exploited in order to lay additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the block-chain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

FIG. 1 shows an example system 100 for implementing a blockchain 150. The system 100 may comprise of a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool". This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151*n* pointing back to the previously created block 151*n*-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151*n* and in which order, and the current pool 154 of unpublished transactions is updated. The blockchain nodes 104 then continue to race to create a block from the newly-defined ordered pool of unpublished transactions 154, and so forth. A protocol also exists for resolving any “fork” that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a “coinbase transaction”, but may also be termed an “initiation transaction” or “generation transaction”. It typically forms the first transaction of the new block 151*n*. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151*n* in which that transaction was published. This fee is normally referred to as the “mining fee”, and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as “clients”) may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with “first party” and “second “party” respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

UTXO-Based Model

Figure 2:
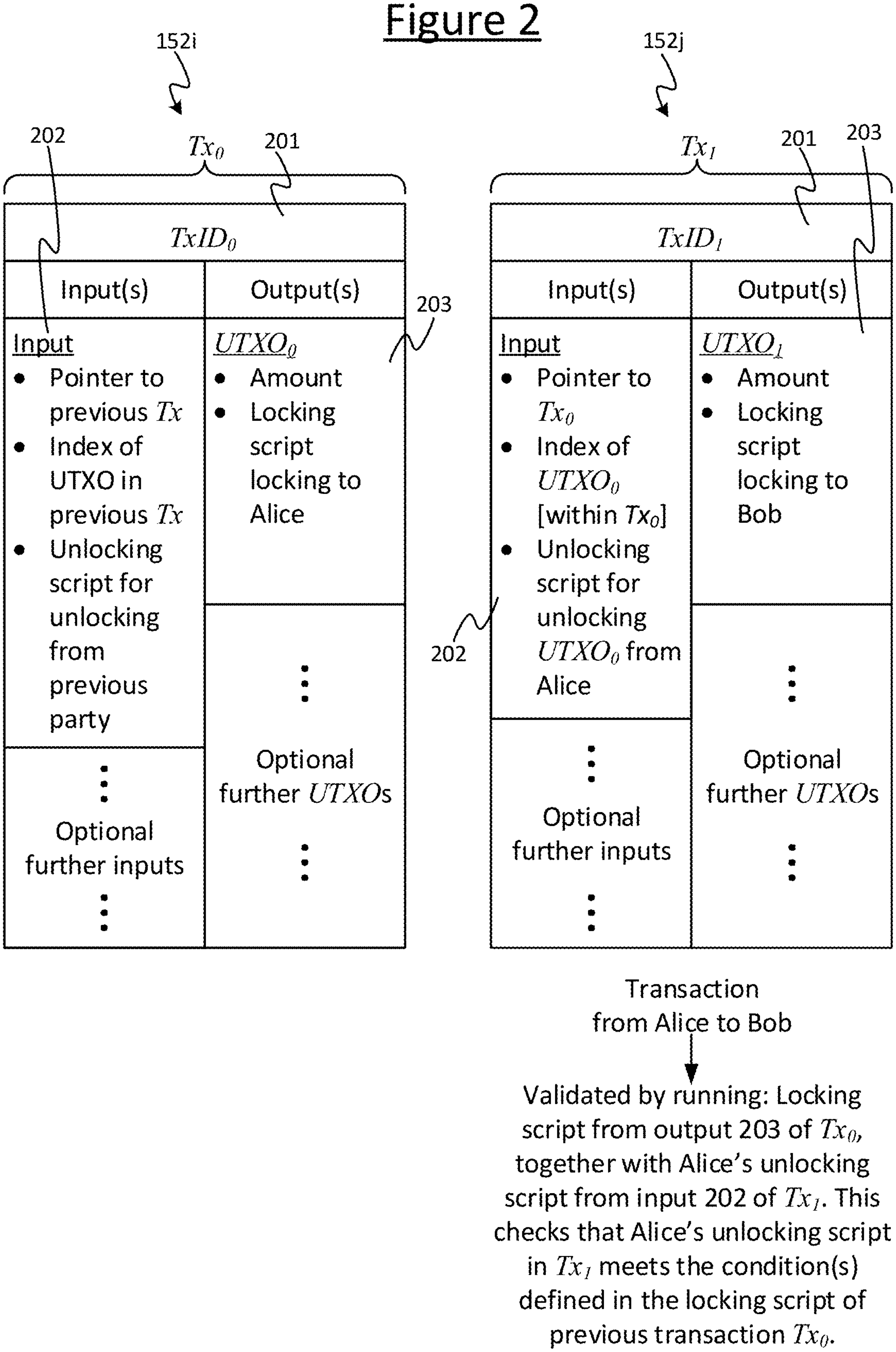

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "$Tx_1$". It takes an amount of the digital asset that is locked to Alice in the output 203 of a preceding transaction 152*i* in the sequence, and transfers at least some of this to Bob. The preceding transaction 152*i* is labelled "$Tx_0$" in FIG. 2. $Tx_0$ and $Tx_1$ are just arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in a block 151 of the blockchain 150 at the time when Alice creates her new transaction $Tx_1$, or at least by the time she sends it to the network 106. It may already have been included in one of the blocks 151 at that time, or it may be still waiting in the ordered set 154 in which case it will soon be included in a new block 151. Alternatively $Tx_0$ and $Tx_1$ could be created and sent to the network 106 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$> <$P_A$>||[Checksig $P_A$]

where "||" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP_ . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

As shown in FIG. 1, the client application on each of Alice and Bob's computer equipment 102*a*, 120*b*, respectively, may comprise additional communication functionality. This additional functionality enables Alice 103*a* to establish a separate side channel 301 with Bob 103*b* (at the instigation of either party or a third party). The side channel 301 enables exchange of data separately from the blockchain network.

Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 301 may be used to exchange any other transaction related data, such as keys, negotiated amounts or terms, data content, etc.

The side channel 301 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102*a*, 102*b*. Generally, the side channel 301 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Client Software

Figure 3A:
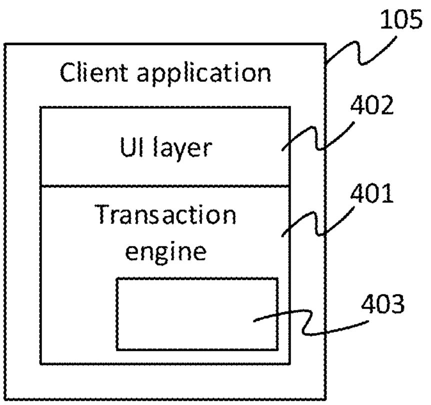
FIG. 3A is a schematic block diagram of a client application.

FIG. 3A illustrates an example implementation of the client application 105, also referred to herein as an electronic signature application, for implementing embodiments of the presently disclosed scheme. The client application 105 comprises a transaction engine 401 and a user interface (UI) layer 402. The transaction engine 401 is configured to implement the underlying transaction-related functionality of the client 105, such as to formulate transactions 152, receive and/or send transactions and/or other data over the side channel 301, and/or send transactions to one or more nodes 104 to be propagated through the blockchain network 106, in accordance with the schemes discussed above and as discussed in further detail shortly. In accordance with embodiments disclosed herein, the transaction engine 401 of each client 105 comprises a function 403 for generating a linking transaction.

The UI layer 402 is configured to render a user interface via a user input/output (I/O) means of the respective user's computer equipment 102, including outputting information to the respective user 103 via a user output means of the equipment 102, and receiving inputs back from the respective user 103 via a user input means of the equipment 102. For example the user output means could comprise one or more display screens (touch or non-touch screen) for providing a visual output, one or more speakers for providing an audio output, and/or one or more haptic output devices for providing a tactile output, etc. The user input means could comprise for example the input array of one or more touch screens (the same or different as that/those used for the output means); one or more cursor-based devices such as mouse, trackpad or trackball; one or more microphones and speech or voice recognition algorithms for receiving a speech or vocal input; one or more gesture-based input devices for receiving the input in the form of manual or bodily gestures; or one or more mechanical buttons, switches or joysticks, etc.

Note: whilst the various functionality herein may be described as being integrated into the same client application 105, this is not necessarily limiting and instead they could be implemented in a suite of two or more distinct applications, e.g. one being a plug-in to the other or interfacing via an API (application programming interface). For instance, the functionality of the transaction engine 401 may be implemented in a separate application than the UI layer 402, or the functionality of a given module such as the transaction engine 401 could be split between more than one application. Nor is it excluded that some or all of the described functionality could be implemented at, say, the operating system layer. Where reference is made anywhere herein to a single or given application 105, or such like, it will be appreciated that this is just by way of example, and more generally the described functionality could be implemented in any form of software.

Figure 3B:
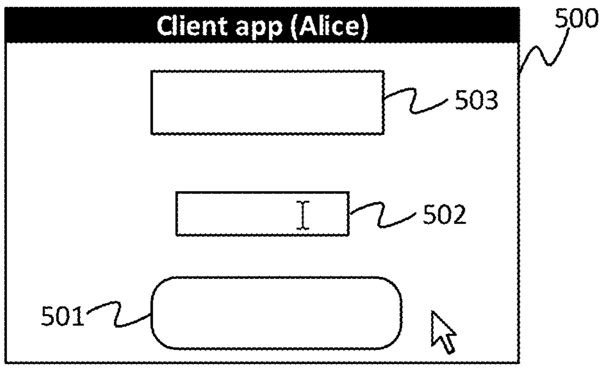
FIG. 3B is a schematic mock-up of an example user interface that may be presented by the client application of FIG. 3A.

FIG. 3B gives a mock-up of an example of the user interface (UI) 500 which may be rendered by the UI layer 402 of the client application 105*a* on Alice's equipment 102*a*. It will be appreciated that a similar UI may be rendered by the client 105*b* on Bob's equipment 102*b*, or that of any other party.

By way of illustration FIG. 3B shows the UI 500 from Alice's perspective. The UI 500 may comprise one or more UI elements 501, 502, 502 rendered as distinct UI elements via the user output means.

For example, the UI elements may comprise one or more user-selectable elements 501 which may be, such as different on-screen buttons, or different options in a menu, or such like. The user input means is arranged to enable the user 103 (in this case Alice 103*a*) to select or otherwise operate one of the options, such as by clicking or touching the UI element on-screen, or speaking a name of the desired option (N.B. the term "manual" as used herein is meant only to contrast against automatic, and does not necessarily limit to the use of the hand or hands). The options enable the user (Alice) to generate a linking transaction by authorising with a signature modifications or and/or linkages between documents.

Alternatively or additionally, the UI elements may comprise one or more data entry fields 502, through which the user can generate a linking transaction. These data entry fields are rendered via the user output means, e.g. on-screen, and the data can be entered into the fields through the user input means, e.g. a keyboard or touchscreen. Alternatively the data could be received orally for example based on speech recognition.

Alternatively or additionally, the UI elements may comprise one or more information elements 503 output to output information to the user. E.g. this/these could be rendered on screen or audibly.

For example, the information elements 503 may render a visual representation of an existing document which is to be authorised with a signature by the user. The user can view the document and decide whether or not to authorise the document with a signature. The user may indicate that they wish to sign the document via the electable elements 501 or the data entry field 502 as discussed below.

The user can indicate a supplementary document to be linked to the existing document by providing an input via the user selectable elements 501 or the data entry fields 502. For example, the user may upload supplementary documents to the electronic signature application 105, or to a database accessible by the electronic signature application 105, prior to generating a linking transaction, such that a library of supplementary document is stored, with a unique reference for each of the stored supplementary documents also stored. The unique references are presented to the user in, for example, a drop-down menu format on the UI 500 for the user to select form. The supplementary document associated with the selected unique reference is then linked to the existing document in the linking transaction. Alternatively or additionally, the user may be able to upload a supplementary document while generating the linking transaction.

Once the user has denoted the supplementary document to be linked to the existing document in the linking transaction, the user provides another input, via the selectable elements 501 for example, which instigates a computation of document signature data associated with the linking transaction. This second user input comprises at least one private key associated with the user (such as a passcode or biometric used for document signing). The private key(s) of the user are then used to compute document signature data, used to authorise a portion of the linking transaction. The user may be required to enter their private key(s) in the data entry fields 502. Alternatively or additionally, the private key(s) may be stored in the electronic signature application 105, or at some location accessible to the electronic signature application 105, such that the user provides some other user verification, such as a password or user biometric, which authorises the electronic signature application 105 to use the stored private key(s). The private key(s) may be stored in either encrypted or unencrypted form. If in an encrypted form, the second user input comprises data for decryption the private key required to compute the document signature data.

The electronic signature application 105 uses the blockchain transaction to render the existing document on the UI 500. As discussed later, the blockchain transaction may comprise either document data of the existing document or a reference to the existing document. The existing document can therefore be rendered using the blockchain transaction either by accessing the document data from the blockchain transaction if stored there or accessing data relating to a previous blockchain transaction in which the existing document data is stored. The existing document may be stored on the blockchain in encrypted, e.g. a hash of the document, or unencrypted form, e.g. plaintext.

Alternatively, the existing document may be received by the electronic signature application 105 from an off-chain source, such as the last actor to authorise the document or the actor responsible for creating the document, and rendered to the user. The electronic signature application 105 can use the blockchain transaction to verify the received existing document. A copy or a hash of the document is stored on the blockchain and can be used for this verification. In the case of the document being stored, the electronic signature application 105 can compare the two document directly. If they are identical, the received version is verified. In the case of the hash of the document being stored on the blockchain, the electronic signature application 105 generates a hash of the received existing document. If the hash generated by the electronic signature application 105 matches that retrieved from the blockchain transaction, the received document is verified.

The electronic signature application 105 locates the blockchain transaction in a blockchain maintained by a blockchain network. The electronic signature application 105 applied at least one validity check to the blockchain transaction before rending the existing document to the user on the UI for the user to authorise with a signature. An example of a validity check which may be implemented by the electronic signature application 105 comprises checking the blockchain transaction has been immutably committed to the blockchain before rendering the existing document to the user for authorising with a signature.

In some embodiments, the electronic signature application 105 provides means for verifying the verifying document modifications. The user may verify these modifications themself by checking who has previously signed the document and comparing this to known rules. The name of the previous singer is displayed to the user on the in the information element 503. An indication that the previous signer has been verified by a third party may be indicated to the user via the electronic signature application 105, for example by rendering a symbol indicating the third party verification next to the pervious signer's name. The modification performed by the previous signer may also be displayed to the user for them to check against known rules.

The electronic signature application 105 may provide a verification function itself. For example, the known rules are known to the electronic signature application 105. The verification function of the electronic signature application 105 checks the data retrieved from the blockchain against the known rules. The electronic signature application 105 indicated to the user whether or not the retrieved data meets the requirements set out by the known rules. In some embodiments, the document is only presented to the user for signing if the requirements are met. In other embodiments, a symbol or some other verification message may be rendered to the user indicating whether or not the rule requirements have been satisfied.

The known rules referenced above may be, for example, rules defining which parties can sign a document, the types of modifications each party can make to the document, the order in which parties must sign the document, and/or if any additional documents need to be linked to the document. It will be appreciated that the rules for each different type of document may be different.

It will be appreciated that the particular means of rendering the various UI elements, selecting the options and entering data is not material. The functionality of these UI elements will be discussed in more detail shortly. It will also be appreciated that the UI 500 shown in FIG. 3 is only a schematized mock-up and in practice it may comprise one or more further UI elements, which for conciseness are not illustrated.

Node Software

Figure 4:
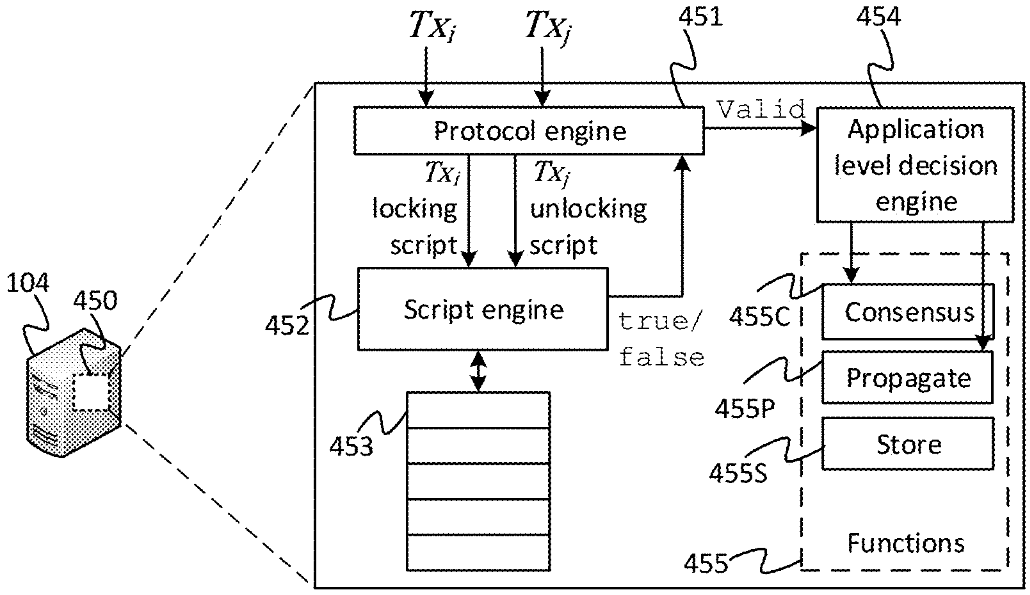
FIG. 4 is a schematic block diagram of some node software for processing transactions, FIG. 5 schematically illustrates a generic linking transaction.

FIG. 4 illustrates an example of the node software 450 that is run on each blockchain node 104 of the network 106, in the example of a UTXO- or output-based model. Note that another entity may run node software 450 without being classed as a node 104 on the network 106, i.e. without performing the actions required of a node 104. The node software 450 may contain, but is not limited to, a protocol engine 451, a script engine 452, a stack 453, an application-level decision engine 454, and a set of one or more blockchain-related functional modules 455. Each node 104 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152*j* ($Tx_j$) is received having an input pointing to an output (e.g. UTXO) of another, preceding transaction 152*i* ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 104. Alternatively, $Tx_i$ may yet to have been published on the blockchain 150. In that case, the protocol engine 451 may retrieve $Tx_i$ from the ordered set 154 of unpublished transactions maintained by the node 104. Either way, the script engine 451 identifies the locking script in the referenced output of $Tx_i$ and passes this to the script engine 452.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 104 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

One Time Cheque

As discussed, embodiments of the present disclosure provide a method of recording modifications to documents and linking different documents on the blockchain. By way of further illustration, a number of possible real-world use cases that could benefit from the digital signature technology taught herein.

By using the blockchain as set out below, the blockchain provides an immutable record of the documents, recording any modifications, such as transfers, endorsements, and cancellations, and by whom the modifications to the documents were made.

Furthermore, by mapping between documents and Bitcoin transactions and between Bitcoin wallet addresses and identities, the blockchain can provide identification, authentication, authorization, linkability between different documents and traceability as each document is developed. It will be appreciated that the present disclosure is not limited to use with Bitcoin and other similar blockchain based spendable coins may be used.

The disclosed method exploits the double-spending prevention feature of cryptocurrency such as Bitcoin and similar coins. The implication of the inability of double spending is the single use of any unspent output of a bitcoin transaction. The single-use property can be applied to negotiable instruments.

The disclosed method increases the difficulty to forge any of the mapped documents to a high level. This is essential when using digital copies of these documents. Mapping between a document and an unspent transaction output is provided. Any change in the status of the document, such as transferring ownership, replacing the document, or cancelling the document, is done by spending the transaction output in a new transaction whose outputs reflect the new status of the document. Thus, it is very easy to check the current status of the document by checking the unspent output that contains the document. It is computationally infeasible to use an expired document, forge a document, or change a document without having the authorization to do so.

As discussed above, unlocking scripts in bitcoin transactions include digital signatures for the purpose of authorizing the assignment of BSV from one locking script to another. In that context, the identity of the UTXO owner is irrelevant.

The method provided herein repurposes the digital signatures in the unlocking script to be meaningful digital signature for the data (such as documents) inserted in the transaction. Thus, the identity of the signer becomes relevant.

A public key certificate is required to provide an authenticated link between the public key and the identity of the owner. However, since it is recommended that a public key value is not to be used in more than one transaction—otherwise the private key may be leaked when the ephemeral key is not generated random enough—it is not ideal to use the certificate public key in signing transactions.

The method provided herein uses "linkable signatures" to overcome this problem. Linkable signatures will be described in more detail below. In essence, a blockchain user has an authorised certificate public key $P_{CA}^{S}$ which they do not use when authorising with a signature transactions on the blockchain. Instead, they use two child public keys $P_{Si}$ and $P'_i$, where $P_{Si}=P_{CA}{}^S+P'_i$. Many pairs of child keys can be generated for a single certificate public key. The signer can prove knowing the secret key of $P_{CA}{}^S$, if she can provide the signatures for the public keys $P_{Si}$ and $P'_i$. These public keys are related to three private keys, which have the same relationship, such that $sk_{Si}=sk_{CA}{}^S+sk'_i$.

A linkable digital signature can be in the form of a single transaction input that contains two signatures, where the locking script is given by [P2PKH $P_{Si}$ P2PKH $P'_i$]. An example of linkable signatures is shown below.

| $TxID_{LinkableSig\_example}$ | | | |
|---|---|---|---|
| Inputs | | Outputs | |
| Value | Script | Value | Script |
| x BSV | <Sig $P_{S1}$><$P_{S1}$> <Sig $P_1'$> <$P_1'$> | y BSV<br>0 BSV | [some locking script]<br>OP_RETURN [certificate transaction id] |

The present disclosure provides a method of linking the spendable outputs of a transaction to documents.

The ownership is mapped to the owner of the unspent transaction output. The owner of the unspent output is referred to as a current authorised actor of the document linked to the spendable output. The document can be modified by the current authorised actor in a new transaction. The authorised actor modifies and authorises the new transaction with their linkable signature.

In the present disclosure, negotiable instruments are used as an example of documents which may be modified and linked to other documents.

A negotiable instrument is a document of title or evidence of indebtedness that is freely transferable in trading as a substitute for money. Negotiable instruments are unconditional orders or promise to pay, and include cheques, drafts, bearer bonds, some certificates of deposit, promissory notes, bills of exchange and bank notes. The process of transferring the right to be paid, i.e. the document that contains the order or undertaking to pay money, is called negotiation.

Negotiability is a characteristic of a document that allows it to be legally and unconditionally assignable or transferable. It allows the passing of its ownership from one party, a transferor, to another, a transferee, by endorsement or delivery.

Documents of contracts may be modified in a number of different ways. The possible modifications include:

creating or issuing;
replacing or editing;
endorsing or accepting;
transferring;
completing; and
cancelling.

It will be appreciated that other types of modifications may also be possible, and the types of modifications depends on the documents and the use case. These modification types will be discussed in more detail in the examples set out below.

In any negotiable instrument (NI) transactions, there are two main actors:

1. the transferor (the current owner of the NI who is passing the NI ownership), also referred to herein as the current authorised actor; and
2. the transferee (the new owner of the NI who is receiving the NI ownership), also referred to herein as a next authorised actor.

In addition to the above, there may optionally be a negotiable instrument issuer who acts as a transferor when the instrument is first created.

In the method disclosed herein, the transferor has to authorise with their signature a transaction input, whereas the transferee would know the unlocking script that can unlock the transaction output. To incorporate identification and authentication requirements, linkable signatures are used to authorise transactions.

Each new transaction has at least one input, which comprises a reference to an unspent transaction output and the corresponding unlocking script associated with that output, where the unlocking script is a signature of a pair of child keys associated with the certificate public key of the authorised actor.

Each new transaction also has at least one spendable output. Each output comprises either document data itself or a reference to the document, an identifier of the next authorised actor, i.e. the actor who can modify the document associated with the output, and a reference to a certificate public key of the next authorised actor. In the case of linkable signatures, the reference to the certificate public key is some form of a pair of child keys associated with the certificate public key of the next authorised actor.

A state may also be inserted into the output of the transaction which indicates the type of modification performed by the authorised actor authorising the transaction with a signature.

When the document is first created, it is inserted in a transaction output with the state of "create" or "issue". Whenever the document is modified, the state of the document in the output of the transaction in which the modification is recorded is changed to indicate the modification.

Below is an example transaction for creating a negotiable instrument. The negotiable instrument is transferred from the issuer to the transferee (Alice). The issuer uses a form of linkable signature, by signing using secret keys $s_{issuer}$ and $s'_{issuer}$, which correspond to public keys $P_{issuer1}$ and $P'_{issuer1}$ where we have $P_{issuer1}=P_{CA}{}^S+P'_{issuer1}$ and $P_{CA}{}^S$ is the issuer certificate public key.

| $TxID_{Issue}$ | | | | |
|---|---|---|---|---|
| Version | 1 | Locktime | 0 | |
| In-count | 1 | Out-count | 1 | |
| | | Output list | | |
| Input list | | | Locking script | |
| Outpoint | Unlocking script | Value | OP_PUSHDATA | P2PKH |
| Outpoint | <Sig $P_{issuer1}$><$P_{issuer1}$> <Sig $P'_{issuer1}$> < $P'_{issuer1}$> | x satoshi | <$NI_{Data}$ \|\| $flag_{issue}$ \|\| $ID_{Alice}$> | <$P_{Alice}$> |

The data inserted in $TxID_{Issue}$ would typically include the following:

1. <$NI_{Data}$>, which includes:
   a. a flag on the type of data, and the standard used, such as Universal Business Language (UBL);
   b. a description of the instrument;
   c. terms and conditions of the NI or a reference to them; and
   d. a uniform resource identifier.
2. The data inserted in <$flag_{issue}$>:
   a flag to indicate the state of the NI. In the above example it is of type issue.
3. The data inserted in <$ID_{Alice}$> would include:
   a. identification of the next owner or authorised actor (Alice); and
   b. a reference to the issuer certificate and identification.

The data inserted in <$P_{Alice}$> is the linkable address of Alice (the transferee) that could be in the form [P2PKH $P_{Alice_i}$ P2PKH $P'_{Alice_i}$] or a 2 of 2 multi-sig, for example.

Alice may then pass the NI to Bob in a transaction by authorising with a signature $TxID_{Issue}||0$.

| $TxID_{Transfer}$ | | | | |
|---|---|---|---|---|
| Version | 1 | Locktime | 0 | |
| In-count | 1 | Out-count | 1 | |
| Input list | | Output list | | |
| | | | Locking script | |
| Outpoint | Unlocking script | Value | OP_PUSHDATA | P2PKH |
| $TxID_{issue}$ \|\| 0 | [Alice linkable signatures] | x satoshi | <$NI_{reference}$ \|\| $flag_{transfer}$ \|\| $ID_{Bob}$> | <$P_{Bob}$> |

The data contained in $TxID_{Transfer}$ would typically differ from $TxID_{Issue}$ in that:

1. adding a reference to the issuing transaction, where the instrument was first issued. The data of the NI is not repeated here, since the NI data has not changed;
2. the state has changed to "transfer"; and
3. the identification of the next authorised actor has changed to that of Bob.

It will be appreciated that the new owner identification may, in some transactions, not changed. For example, if an authorised actor edits or replaces the document data, the same actor may still be authorised to modify the edited or replaced document.

An observer can easily trace $TxID_{Transfer}$ to the parent transaction $TxID_{Issue}$, and check the authentication of the issuer and confirm that there is no double spending of the NI.

The NI can change hands to many owners. Each time it is recorded on a transaction $TxID_i$, where $TxID_i$ would have $TxID_{i-1}$ as an input (i.e. parent transaction). The data contained in $TxID_i$ would typically include a state transfer, the next authorised actor and a reference to the valid NI data transaction $TxID_{Issue}$.

FIG. 5 shows an example of a modification transaction 500 in accordance with the present invention. Both $TxID_{Transfer}$ and $TxID_{Issue}$ are examples of modification transactions 500. The modification transaction 500 can be identified by its unique transaction ID 502. The unique transaction ID 502 can be used to track a document and its modifications on the blockchain.

The modification transaction 500 comprises an input list comprising at least one input and an output list comprising at least one output. Two inputs 506*a*, 506*b* and four outputs 504*a-c* are shown in the example of FIG. 5, however it will be appreciated that any number of inputs and outputs may be used in a single transaction. A single modification transaction 500 can therefore be used to modify multiple document.

Each input 506*a*, 506*b* of the modification transaction 500 comprises an outpoint and a locking script. The outpoint references an output of a previous modification transaction. The previous modification transaction need not be published to the blockchain at the time the modification transaction 500 is propagated.

Each input 506*a*, 506*b* also comprises an unlocking script. The unlocking script comprises the linkable signature of the current authorised actor of the output referenced by the outpoint.

The unlocking scrip may also comprise the SIGHASH flag, which indicates which of the outputs of the modification transaction the current authorised actor associated with the linkable signature is authorising. For example, if the SIGHASH flag is set to SIGHASH_ALL, the current authorised actor authorises all of the modifications of the modification transaction 500, i.e. they authorise all of the modifications in the transaction output list. However, if set to SIGHASH_SINGLE, the current authorised actor only authorises the modification of a single output of the modification transaction 500.

Each output 504*a*, 504*b*, 504*c*, 504*d* of the modification transaction 500 is a spendable output. Each output 504*a*, 504*b*, 504*c*, 504*d* has an associated value, here shown as an amount in satoshi. It will be appreciated that any blockchain currency and any unit of the currency may be used to assign a value to the output. Each output 504*a*, 504*b*, 504*c*, 504*d* can be assigned separately in one or more subsequent modification transactions.

Each output 504*a*, 504*b*, 504*c*, 504*d* comprises a locking script. The locking script has two components: that data to be stored to the blockchain and the identity of the next authorised actor of the document associated with the output.

The data to be stored to the blockchain comprises either the document data of the negotiable instrument or a reference to the negotiable instrument. The document data does not need to be stored to the blockchain in every transaction, only those in which the document data is changed, for example when the document is issued or replaced. The document data can be found, if required, by tracing the modifications of the document back through the blockchain using the document reference and the outpoints of each transaction. In the example of FIG. 5, there are two outputs 504*a*, 504*d* which comprise document data and two outputs 504*b*, 504*c* which comprise a reference to a document. The document data of the document referenced in outputs 504*b* and 504*c* is published to the blockchain in a previous modification transaction.

The data to be stored to the blockchain also comprises the state of the document. As discussed above, the state indicates the type of modification the negotiable instrument has undergone in the transaction. The modification is performed by the current authorised actor who authorises the transaction with a signature.

For example, the current actor of input 506*a* authorises all of the outputs 504*a*, 504*b*, 504*c*, 504*d* of the modification transition 500. This is indicated by the SIGHASH_ALL flag in the unlocking script. However, the current authorised actor of input 506*b* only authorises output 504*b*, as indicated by the SIGHASH_SINGLE flag. The state of the documents in outputs 504*a*, 504*c* and 504*d* corresponds to the modification performed by the authorised actor of inputs 506*a*, and the state of the document in output 504*b* corresponds to the modification performed by the authorised actors of inputs 506*a* and 506*b*.

Other types of SIG HASH flags may be used. For example, a SIGHASH_AnyOneCanPay may be used if two actors are required to authorise a modification but only one of the two actors authorises the transaction. That is, more inputs can be added at a later date by the second signing actor.

The data to be stored to the blockchain is inserted using an OP_PUSHDATA script opcode. This opcode pushes the data onto the stack in a way in which the output is spendable. This differs from instances where an OP_RETURN script opcode, in which the data is pushed to the stack but the output is not spendable. It will be appreciated that the data may be inserted using the OP_RETURN script rather than the OP_PUSHDATA script.

The unlocking script of each output 504*a-d* also comprises an identifier of the next authorised actor(s) of the document associated with the output 504*a-d*. The next authorised actor is an actor who is authorised to modify the document in a subsequent modification transaction. The identifier may comprise the certificate public key of the next authorised actor and/or a pair of child public keys of the next authorised actor.

The identifier of the next authorised actor may be in the form of a pay to public key (P2PK) or pay to public key hash (P2PKH). P2PKH is used in the examples used herein.

The outputs 504*a* and 504*c* only identify a single next authorised actor. However, outputs 504*b* and 504*d* identify two next authorised actors. It will be appreciated that any number of next authorised actors may be identified for a single output.

The outputs 504*b* and 504*d* identify two next authorised actors. Output 504*d* requires a multi-sign 1 of 2. This allows one or other of the two identified next authorised actors to modify the document without the authorisation of the other identified next actor. There may be restrictions on the modifications that the next authorised actors can perform. For example, the actor identified by $P_{next5}$ may only be able to authorise a modification to $Document_A$ if the actor identified by $P_{next6}$ has not yet modified the document.

Output 504*b* requires a multi-sign 2 of 2. That is, both of the identified next authorised actors are required to authorise a modification to $Document_Y$.

The next authorised actor who modifies a document in a subsequent modification transaction is the current authorised actor for that document in the subsequent transaction.

Each actor may be authorised to perform only one or some types of modifications to a document. For example, a current authorised user may be authorised to replace or endorse a document, but not mark it as complete. As discussed above, the modifications which an authorised actor is authorised to perform may depend on whether or not another authorised actor has performed a certain modification to the document. A multi-sign 1 of 2 can be used here. For example, a first current authorised actor may be authorised to cancel a document only if a second current authorised actor has not yet endorsed it.

An example implementation for the modification transaction 500 will now be described. In the examples set out herein, the use of negotiable instruments in shipping (an export-import process) has been used as an example implementation. This is not a limiting example and the skilled person will appreciate that the disclosed method may be used in any use case involving the modification of negotiable instruments.

There are six main actors in the export-import process: exporter, importer, shipper, carrier, bank, and Chamber of Commerce.

The exporter is the person who has the goods. This is also known as the seller or manufacturer. In this paper we use the term exporter. She/He is required to fill out: a commercial invoice, and a certificate of origin (COO).

The importer is the person or the company that is buying the goods, also known as buyer. It applies for letter of credit in case that is the agreed method of payment.

The shipper is the party responsible to book the carrier and arrange the shipping. This could be an owner of the cargo or an agent. It can be the exporter or the importer. This is also known as consignor, or transport user. This party is required to fill out: a packing list, and a Shipper Letter of Instruction.

The carrier is also known as a transport service provider. They are responsible for the physical transportation of the goods.

Banks play a major role in guaranteeing payment in international trading. More about their different roles will be discussed later in the Letter of Credit (LoC) section.

The Chamber of Commerce, or other authorised government bodies, may need to sign the certificate of origin. The certificate of origin is submitted to the Local chamber of commerce for endorsement. The Chamber of Commerce must have access to relevant documents such as a commercial invoice (CI) and Bill of Lading (BoL) in order to verify the exporter's claims.

Figure 6:
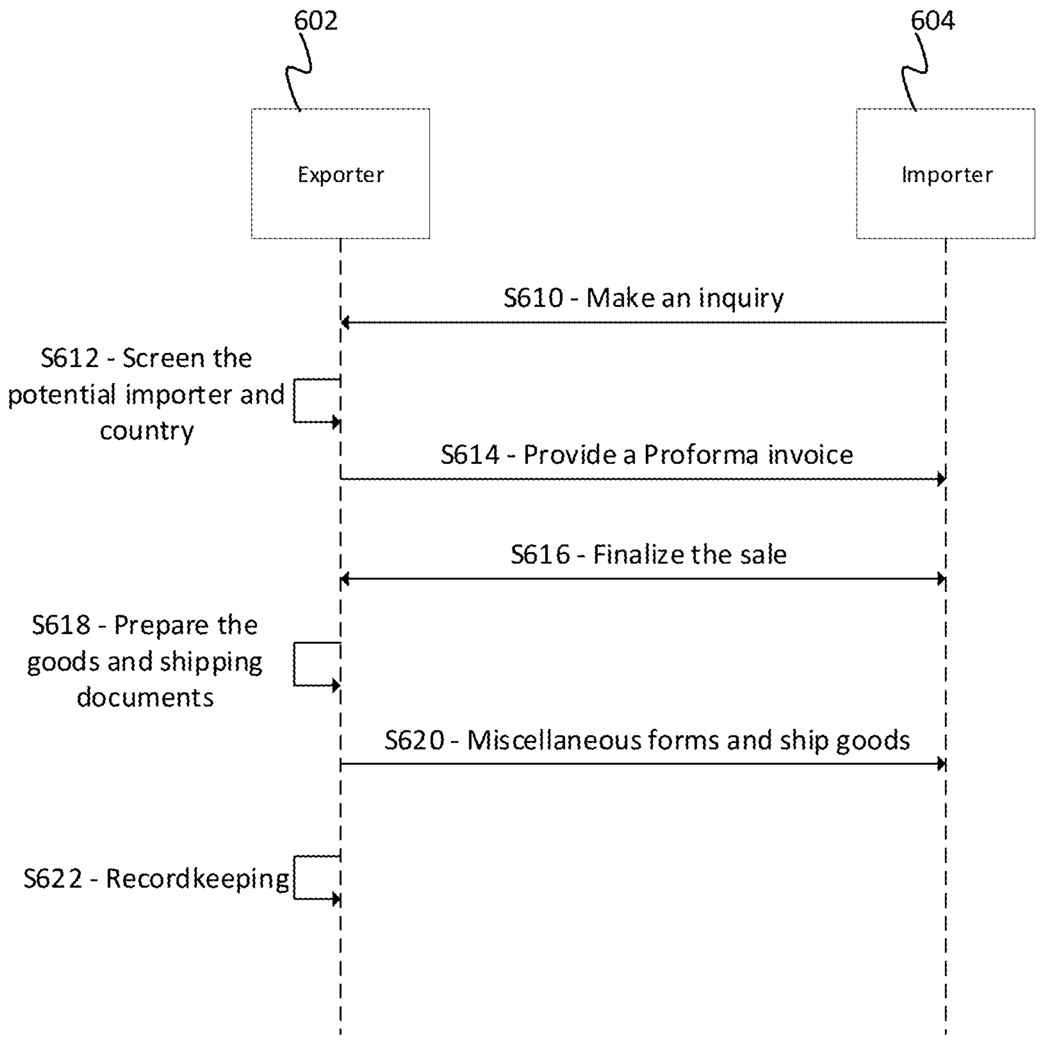
FIG. 6 shows an example export-import process.

FIG. 6 shows an example process of import and export between an importer 604 and an exporter 602. FIG. 6 emits any other actors for simplicity. The roles of other actors will be discussed later.

At step S610, the importer 604 makes an inquiry with regards to importing goods from the exporter 602.

At step S612, the exporter screens the potential importer 604 and the country to which the goods are to be imported. This step may involve determining if there are import restrictions or taxes.

At step S614, the exporter 602 provides the importer 604 with a proform invoice.

The sale is then finalized between the importer 604 and exporter 602. This step comprises the two parties 602, 604 agreeing on the following: payment terms, terms of sale, how goods will be shipped, who is responsible for shipping, who is responsible for hiring a freight forwarder or carrier, who is responsible for filing, how the transaction will be paid e.g. letter of credit, and other documents required by the regulations.

At step S618, the exporter prepares the goods. The shipping documents are also prepared at this step. The shipping documents include: a commercial invoice, a packing list, a certificate of origin (COO), a shipper's letter of instruction, and a bill of lading (BoL). These documents are described in Annex A. The possible states of the documents are set out in Annexes B-E.

The goods are shipped to the importer 604 at step S620 and the exporter 602 performs recordkeeping tasks at step S622.

The two main negotiable instruments used in shipping and international sales are the letter of credit and the Bill of Lading. These documents will be discussed in more detail below.

The Bill of Lading (BoL) can serve three functions:

1. It is a conclusive receipt from the carrier to the shipper, i.e. an acknowledgment that the goods have been loaded.

2. It evidences the terms of the contract of carriage.
3. It serves as a document of title (i.e. a negotiable instrument) to the goods.

A carrier (or an agent of the carrier) usually issues 3 original BoL in addition to 3 copies. A BoL must accompany the shipped products and must be signed by authorised representatives of the carrier, the shipper and the receiver (consignee).

There are three main actors in the BoL:

1. Shipper: also known as Consignor. This is the person who enters into a contract of carriage with the carrier. This can be the importer or the exporter depending on their agreed terms of sale.
2. Carrier: The transport company representative, or the ship master. This is the party who provides the physical transportation services.
3. Consignee: the person entitled to take delivery of the goods under a contract of carriage indicated on a bill of Lading. This could be the importer, importer's bank or the bank issuing the Letter of Credit.

See Annex D for the mapping of modification of the BoL to the blockchain.

Without an authentic BoL the shipper cannot release the cargo. It is essential to have the BoL protected against forgery.

Figure 7:
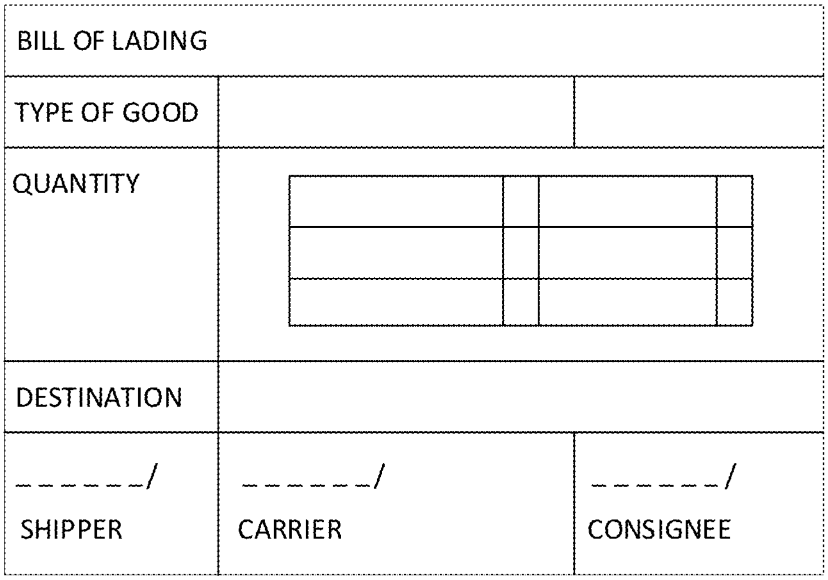
FIG. 7 is a diagram of a Bill of Lading.

FIG. 7 shows a diagram of Bill of Lading. The BoL comprises fields for stating the type of goods in the cargo, the quantity of each specific good, and the destination of the goods. The Bill of Lading is to be signed by the shipper, the carrier, and the consignee.

Bill of Ladings may be negotiable, where the name of the consignee can be changed such that the BoL can be transferred multiple times, or non-negotiable, such that the goods are consigned to a specified person and it cannot be transferred.

Figure 8:
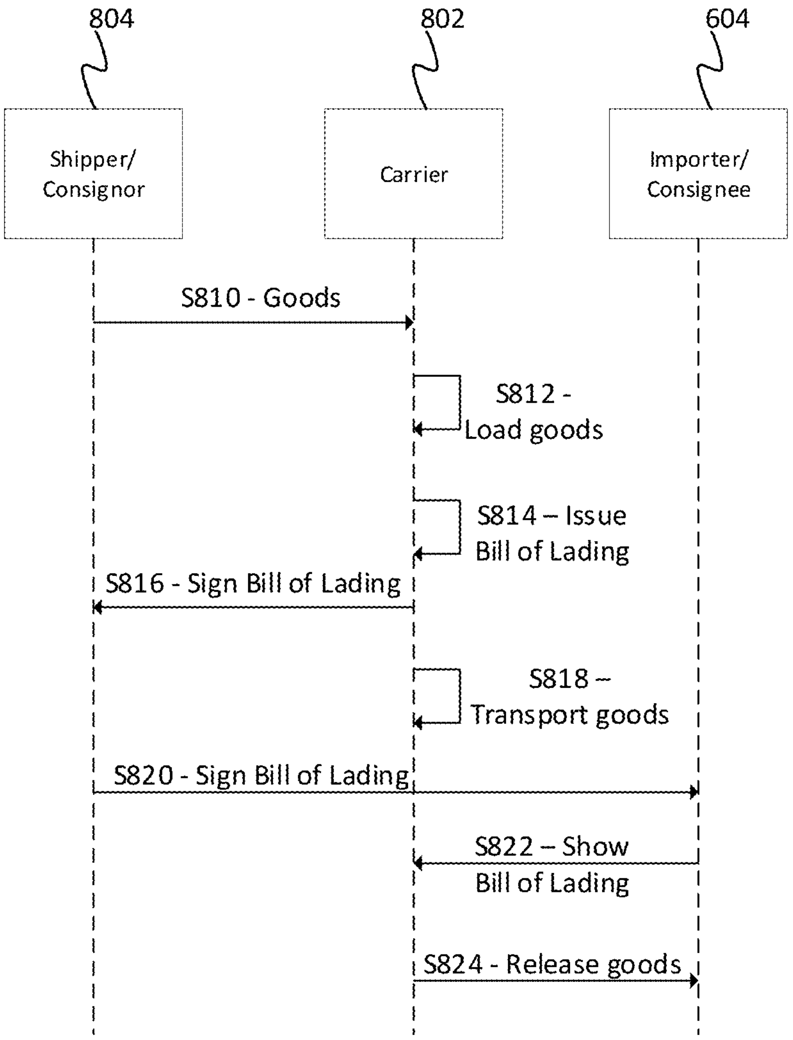
FIG. 8 shows an example sequence for the use of a Bill of Lading in the export-import process.

FIG. 8 shows an example sequence for the use of a Bill of Lading in the export-import process.

At step S810, the shipper 804 transfers goods to be shipped to the carrier 802, who loads the goods at step S812 and issues a BoL at step S814. When issuing the BoL, the carrier 802 signs it.

The carrier 802 provides the BoL to the shipper 804, who signs the BoL at step S816.

The carrier 802 transports the goods to the destination at step S818.

At step S820, the BoL is signed by the importer 604 at step S820. The BoL is now signed by all three parties 802, 804, 604.

The importer 602 shows the BoL signed by the three parties to the carrier 802 at step S822. This acts as proof that the importer 604 is entitled to the goods. The carrier 802 then releases the goods to the importer 604 at step S824.

The letter of credit (LOC) guarantees that the exporter gets paid either by the importer or by the bank. In case of the latter, it is also known as a documentary LOC or documentary credit. A documentary LOC is a contract under which a bank agrees to pay the exporter, in connection with the export of specific goods, against the presentation of specified documents relating to those goods. The documentary LOC is issued at the request of the importer (the applicant for the credit) in favour of the exporter (the beneficiary of the credit. A letter of credit is typically a negotiable instrument, as the issuing bank pays the beneficiary or any bank nominated by the beneficiary.

Figure 9:
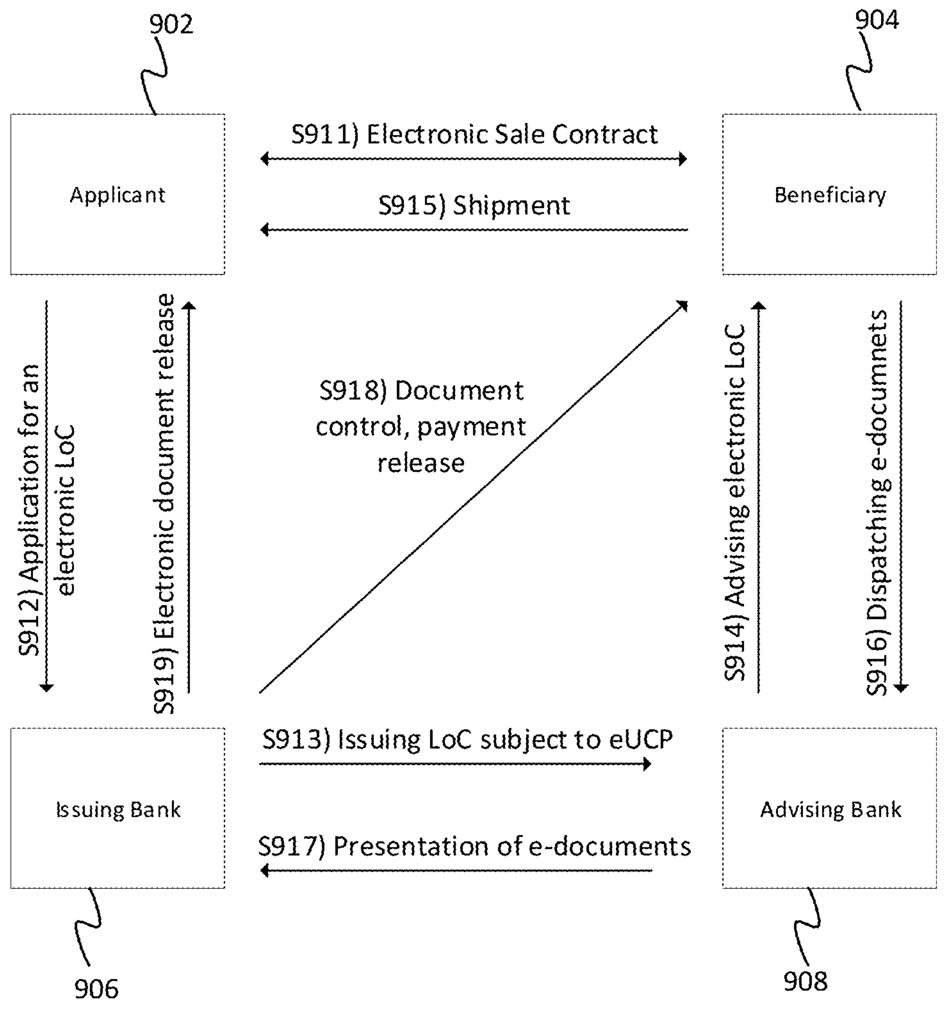
FIG. 9 shows an example process of using a letter of credit in the export-import process, FIG. 10 schematically illustrates how modifications to a document can be validated both on and off the blockchain, and FIG. 11 schematically illustrates a set of transactions for linking documents.

FIG. 9 shows an example process of using a letter of credit in the context of an export-import shipment. There are four main parties in the process.

A beneficiary 904 is the party in whose favour a credit is issued. In the context of shipping, this is the exporter 602 of the goods in the underlaying contract.

An applicant 902 is the party on whose request the credit is issued. In the context of shipping, this is the importer 604.

The applicant 902 and beneficiary 904 agree the terms of the sale and exchange electronic sale contract at step S911.

The applicant 902 applies for an electronic LOC from an issuing bank 906 at step S912.

The issuing bank 906 is a bank which opens and finalizes the LOC. It is the bank that issues a credit at the request of an applicant 902 or on its own behalf. It is the ultimate payer of the LOC. An issuing bank 906 is irrevocably bound to honour a complying presentation as of the time it issues the credit. Issuing banks 906 evaluate LOC applications mainly in two categories: compliance with the issuing bank policies; and correctness of the instructions of the applicant.

At step S913, the issuing bank 906 issues the LOC to an advising bank 908. This may be subject to a set of rules, such as the eRules for the Uniform Customs & Practice for Documentary Credits (eUCP).

Usually, the advising bank 908 and the exporter 602 are located at the same country and have a business relationship with each other. The exporter 602 informs his advising bank 908 preferences to the importer 604 during the negotiation phase of the transaction.

The advising bank 908 has two main responsibilities:

must signify that it has satisfied itself to the apparent authenticity of the letter of credit or amendment; and must ensure that the advice of the LOC accurately reflects the terms and conditions of the credit or amendment from the issuing bank 906.

The advising bank 908 advises the LOC to the beneficiary 904 at step S914. The beneficiary 904 then ships the goods to the applicant 902 at step S915 and, at step S916, sends dispatching e-documents to the advising bank 908 as proof of shipping.

The advising bank 908 presents the e-documents to the issuing bank 906 at step S917. The issuing bank 906 implements a documents control process and then releases the payment associated with the shipped goods to the beneficiary 904 at step S918. This payment may be sent to the beneficiary 904 via the advising bank 908.

The issuing bank 906 releases the electronic documents to the applicant 902 at step S919.

Figure 11:
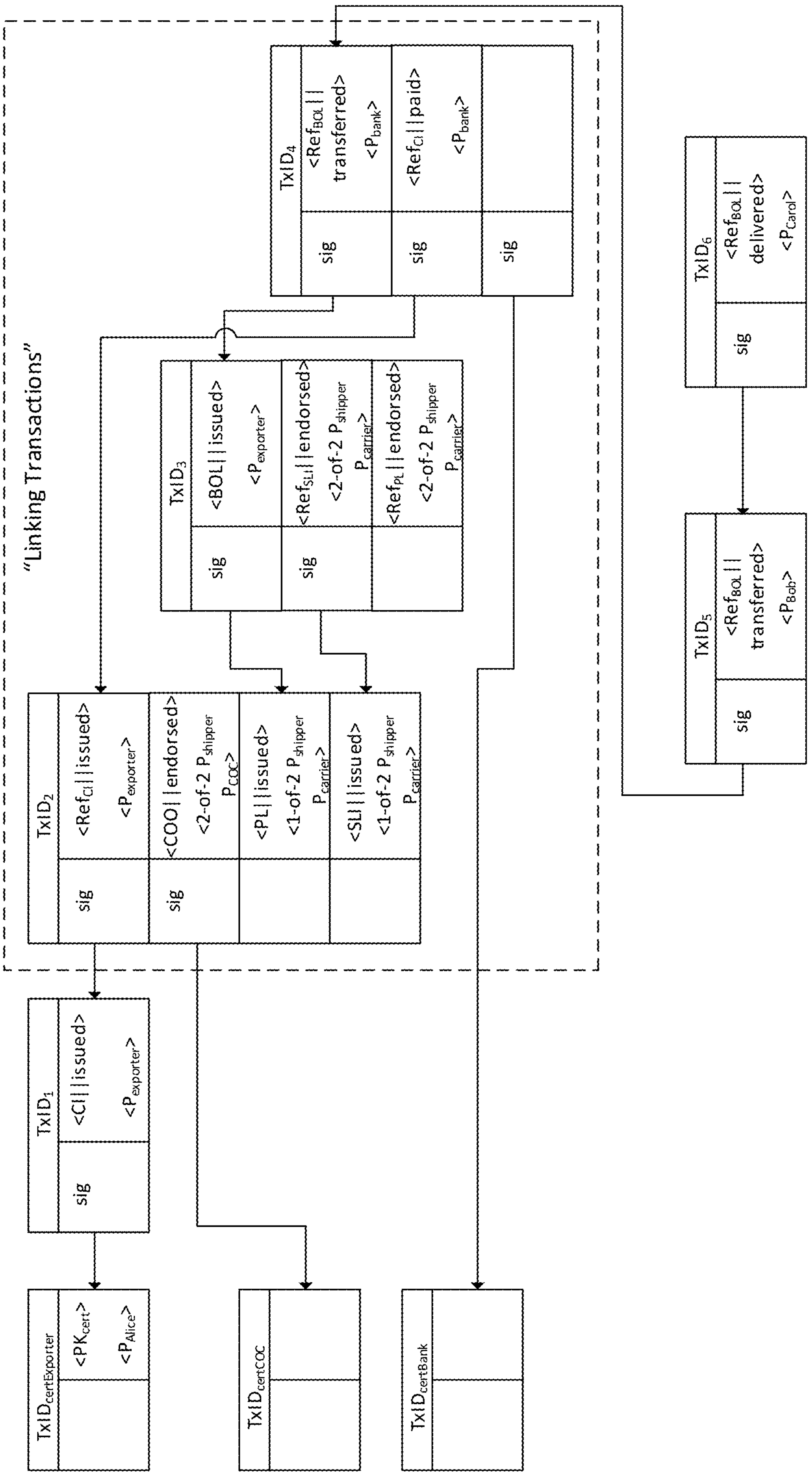

FIG. 11 shows an example a set of transactions, comprising three "linking" transactions, for use in shipping. The linking transactions $TxID_2$, $TxID_3$, and $TxID_4$ are created sequentially over time, followed by blockchain transactions $TxID_5$ and $TxID_6$ respectively.

Transactions $TxID_2$ and $TxID_3$ are linking transactions that link one or more new supplementary documents to an existing documents, contained or referenced in an earlier transaction. Transaction $TxID_4$ links at least two existing documents (both contained or referenced in previous blockchain transactions).

Further details of possible forms the transactions $TxID_2$, $TxID_3$, and $TxID_4$ could take are provided in the description below, and the transaction tables accompanying the description.

The linking transactions shown in FIG. 11 provide a method of linking the different modifications of the documents involved in the import-export process as set out in Annexes B-E.

The term "modification transaction" is used herein, to refer to a transaction that modifies the content or status of an existing document. In the following examples, the linking transactions $TxID_2$, $TxID_3$, and $TxID_4$ are also modification transactions in this sense, but in general, a linking transaction need not necessarily be a modification transaction, and modification transactions may or may not be linking transactions.

Alice is a manufacturer and exporter of tennis balls in country A, Bob is an importer in country B. They agreed on terms of sale and payment using letter of credit. Shipping documents including the Bill of Lading would be on the blockchain. There are four stages:

1. Alice and Bob agree the terms of sale and Alice issues an invoice;
2. Alice prepares the shipping documents and the shipment;
3. Carol—who has a Carrier company—is responsible for transportation. She receives the cargo from Alice, who is the shipper. Carol issues Alice the Bill of Lading;
4. Alice gets paid by the bank after providing proofs of shipping; and
5. Bob settles with the bank and gets the cargo released from Carol using the BOL.

The transactions for each stage are set out below.

Stage 1—Alice and Bob agree the terms of sale and Alice issues an invoice.

First, a preliminary transaction is needed to create a transaction with linkable signature. $TxID_{Cert_{exporter}}$ is a transaction made by Alice, where she creates a transaction output that references her public key certificate. The Locking script of the transaction consists of a concatenation of P2PKH $P_{Alice_i}$, and P2PKH $P'_{Alice_i}$, where we have $P_{Alice_i}=P'_{Alice_i}+P_{CA}^{Alice}$ and $P_{CA}^{Alice}$ is the public key certificate. Thus spending $TxID_{Cert_{exporter}}$ in any transaction, is an evidence that the spender knows the secret key in the public key certificate (i.e. the signer is Alice).

| $TxID_{Cert_{exporter}}$ | | | | |
|---|---|---|---|---|
| Version | 1 | Locktime | | 0 |
| In-count | 1 | Out-count | | 1 |
| | | Output list | | |
| Input list | | | Locking script | |
| Outpoint | Unlocking script | Value | OP_PUSHDATA | P2PKH |
| Outpoint | [Alice signature] | x satoshi | <PK Certificate> | [P2PKH $P_{Alice_i}$ P2PKH $P_{Alice_i}'$] |

Similarly any other player who wants to use linkable signature should create a similar transaction to $TxID_{Cert_{exporter}}$.

In the next transaction, $TxID_1$, Alice maps the issued commercial invoice in a transaction.

The transaction $TxID_1$ spends $TxID_{Cert_{exporter}}\|0$, which proves that the invoice data is authorized by Alice.

The locking script <$P_{exporter}$> in $TxID_1\|0$ can also be linked to the certificate of Alice by appending the certificate to it. Thus, the locking script looks like:

OP_PUSHDATA <Commercial Invoice> <flag: issued> OP_DROP OP_PUSH DATA <PK Certificate$_{Alice}$> OP_DROP [P2PKH $P_{Alice_i}$ P2PKH $P'_{Alice_i}$]

Alice can spend $TxID_1\|0$ in a new transaction, when she decides to replace or cancel the invoice, when the invoice is paid, or when she wants to link the invoice data to shipping documents (as is shown in the next step).

| $TxID_1$ | | | | |
|---|---|---|---|---|
| Version | 1 | Locktime | | 0 |
| In-count | 1 | Out-count | | 1 |
| Input list | | Output list | | |
| | Unlocking script | | Locking script | |
| Outpoint | Signature | Value | OP_PUSHDATA | P2PKH |
| $TxID_{Cert_{exporter}}$ \|\| 0 | [Exporter linkable signatures] | x satoshi | <Commercial Invoice> \|\| <flag: issued> | <$P_{exporter}$> |

Step 2—Alice prepares the shipping documents and the shipment.

Alice creates a transaction TxID$_2$ that has the following documents: Shipper Letter of Instructions, Certificate of Origin and Packing List.

She also spends TxID$_1$||0 in the input of TxID$_2$ thus linking the commercial invoice to the shipping documents. The data inserted in the first output TxID$_2$||0<Reference$_{CI}$||Status: issued> links to the transaction that includes the Commercial Invoice (CI) data, and shows the current status of the invoice. If there are any new changes to the invoice, that will be recorded in a new transaction that spends TxID$_2$||0 The original invoice can always be retrieved from the transaction TxID$_1$. On the other hand, after spending the output TxID$_1$||0, the right to change the invoice data or status is transferred from the output TxID$_1$||0 to the output TxID$_2$||0.

The Certificate of Origin (COO) is also inserted in this transaction. The Chamber of Commerce (COC) signature is inserted in the second input. The TxID$_{Cert_{COC}}$ is a transaction that links to the COC public certificate (i.e. The TxID$_{Cert_{COC}}$ is similar to TxID$_{Cert_{exporter}}$). Note that the COO is issued and endorsed by the signature of both the exporter and the COC. On the other hand, since the output TxID$_2$||1 can only be spent using Multi-sig 2 of 2, it means the document requires the signatures of both parties (the shipper and the COC) to be replaced or cancelled.

The packing list (PL), and SLI documents are issued by the exporter but not yet endorsed by the carrier. Being issued and not yet endorsed, we want to allow the exporter alone to be able to cancel or replace any of them without having the carrier signature. Thus, Multi-sig 1 of 2 is used. This allows the carrier alone to spend the output when endorsing the documents, or the exporter to replace or cancel the documents as long as the carrier has not already endorsed them.

| TxID$_2$ | | | | |
|---|---|---|---|---|
| Version | 1 | Locktime | 0 | |
| In-count | 2 | Out-count | 4 | |
| | | Output list | | |
| Input list | | | Locking script | |
| Outpoint | Unlocking script | Value | OP_PUSHDATA | P2PKH |
| TxID$_1$ \|\| 0 | [Exporter linkable signatures SIGHASH ALL] | x satoshi | <Reference$_{CI}$> \|\| <issued> | <P$_{exporter}$> |
| TxID$_{Cert_{COC}}$ \|\| 0 | [COC linkable signatures SIGHASH SINGLE] | x satoshi | <C.O.O.> \|\| <endorsed> | Multi - sign 2 of 2 <P$_{shipper}$ P$_{COC}$> |
| | | x satoshi | <Packing list> \|\| <issued> | Multi - sign 1 of 2 <P$_{shipper}$ P$_{carrier}$> |
| | | x satoshi | <SLI> \|\| <issued> | Multi - sign 1 of 2 <P$_{shipper}$ P$_{carrier}$> |

Stage 3—Carol—who has a Carrier company—is responsible for transportation. She receives the cargo from Alice, and issues Alice the Bill of Lading.

In $TxID_3$ Carol spends $TxID_2$||2 and $TxID_2$||3, which amounts to endorsing both the PL and the SLI documents created by Alice (the shipper). Carol also issues a Bill of Lading. $TxID_3$ can be put in the blockchain only when parent transaction $TxID_2$ is sent. Also note that the unlocking script of $TxID_3$ contains the PL and the SLI references with the status flags changed from issued to endorsed. To change the status of any of SLI or PL requires spending the outputs $TxID_3$||1 and $TxID_3$||2 respectively. i.e. the right to change the status of these documents have been transferred from the owner of the outputs of $TxID_2$||2 and $TxID_2$||3 to the owner of the outputs $TxID_3$||1 and $TxID_3$||2. Note that since SLI and PL are now endorsed they require signatures of the Carrier and the Shipper. Thus, Multi-sig 2 of 2 is used in the second and third outputs of $TxID_3$.

| $TxID_3$ | | | | |
|---|---|---|---|---|
| Version | 1 | Locktime | 0 | |
| In-count | 2 | Out-count | 3 | |
| Input list | | Output list | | |
| | | | Locking script | |
| Outpoint | Unlocking script | Value | OP_PUSHDATA | P2PKH |
| $TxID_2$ \|\| 2 | [Carrier linkable signatures SIGHASH ALL] | x satoshi | <Bill of Lading> \|\| <issued> | <$P_{exporter}$> |
| $TxID_2$ \|\| 3 | [Carrier linkable signatures SIGHASH ALL] | x satoshi | <$Reference_{SLI}$> \|\| <endorsed> | Multi - sign 2 of 2 <$P_{shipper}$ $P_{carrier}$> |
| | | x satoshi | <$Reference_{PL}$> \|\| <endorsed> | Multi - sign 2 of 2 <$P_{shipper}$ $P_{carrier}$> |

Stage 4—Alice is paid by the bank after providing proofs of shipping

There are two important documents that Alice needs to provide to get paid; the Bill of Lading signed by the carrier, and the invoice. Alice uses the unspent outputs $TxID_3$||0 and $TxID_2$||0 for the BOL and the invoice respectively to the Bank. The bank should do the following:

a. trace all parent transactions of the presented transaction, $TxID_{1\ to\ 3}$;
b. check that they were indeed signed by the claimed entities, (this includes checking that correct hash flags are used); and
c. check that the details in the shipping documents (BOL, PL, SLI, COO) match the terms and conditions in the Letter of Credit.

When Alice is paid she signs a transactions $TxID_4$ where she spends $TxID_3$||0 and $TxID_2$||0. She also transfers the BOL to the Bank, and maps the transfer as an output $TxID_4$||0, which contains a reference to the BOL in $TxID_3$ and a flag Transferred to indicate that the owner of the output $TxID_4$||0 can collect the goods. She also inserts in the second output a reference to the commercial invoice with the status flag paid.

The bank also optionally signs the transaction to indicate his endorsement. The bank's input $TxID_{Cert_{Bank}}$||0 is a transaction that provides a link to the bank certificate (similar to $TxID_{Cert_{exporter}}$ of Alice).

| $TxID_4$ | | | | | |
|---|---|---|---|---|---|
| Version | | 1 | Locktime | 0 | |
| In-count | | 3 | Out-count | 2 | |
| Input list | | | Output list | | |
| | Unlocking script | | | Locking script | |
| Outpoint | Signature | Hash flag | Value | OP_PUSHDATA | P2PKH |
| $TxID_3$ \|\| 0 | [Exporter linkable signatures SIGHASH ALL] | | x satoshi | <$Reference_{BOL}$> \|\| <transferred> | <$P_{bank}$> |
| $TxID_2$ \|\| 0 | [Exporter linkable signatures SIGHASH ALL] | | x satoshi | <$Reference_{CI}$> \|\| <paid> | <$P_{bank}$> |

-continued

| TxID$_4$ | | | | | |
|---|---|---|---|---|---|
| TxID$_{Cert_{Bank}}$ \|\| 0 | [Bank linkable signatures SIGHASH ALL] | | | | |

Stage 5—Bob settles with the bank and gets the BOL transferred to him.

Bob pays the bank and gets the BOL transferred to him, so that he can use it to release the goods. The bank creates a transaction that spends TxID$_4$||0 and transfers the BOL to Bob in that transaction. It is possible for Bob to trace all parent transactions of TxID$_5$ to ensure that the BOL referenced is signed by the carrier and according to the terms and conditions agreed with Alice.

| TxID$_5$ | | | | | |
|---|---|---|---|---|---|
| Version | 1 | | Locktime | 0 | |
| In-count | 1 | | Out-count | 1 | |
| Input list | | | Output list | | |
| | Unlocking script | | | Locking script | |
| Outpoint | Signature | Hash flag | Value | OP_PUSHDATA | P2PKH |
| TxID$_4$ \|\| 0 | [Bank linkable signatures SIGHASH ALL] | | x satoshi | <Reference$_{BOL}$> \|\| <transferred> | <P$_{Bob}$> |

Stage 6—Bob gets the cargo released from Carol using the BOL.

Now Bob uses unspent transaction TxID$_5$||0 to get the goods released from Carol. He creates transaction TxID$_6$.

| TxID$_6$ | | | | | |
|---|---|---|---|---|---|
| Version | 1 | | Locktime | 0 | |
| In-count | 1 | | Out-count | 1 | |
| Input list | | | Output list | | |
| | Unlocking script | | | Locking script | |
| Outpoint | Signature | Hash flag | Value | OP_PUSHDATA | P2PKH |
| TXID$_5$ \|\| 0 | [Bob linkable signatures SIGHASH ALL] | | x satoshi | <Reference$_{BOL}$> \|\| <delivered> | <P$_{Carol}$> |

Note that the data inserted in the output of $TxID_6$||0 has the flag delivered now. Carol could optionally add her signature to the transaction to show endorsement (This is not shown here).

In some embodiments, when Carol delivers and releases the goods to Bob, the evidence of her delivering the transportation service is recorded in $TxID_6$. This could be an adequate proof. However, if there is a need to change the flag status of the PL and SLI documents from the status endorsed to the status complete. In that case, Alice could sign a transaction $TxID_7$partial that spends the outputs $TxID_3$||1,2 with two outputs for PL and SLI documents and flag complete. That transaction still requires the signature of the carrier to be completed, since $TxID_3$||1,2 require 2 of 2 multi-sig. The bank would keep the incomplete transaction, and would pass it to Bob when Bob gets the BOL. Upon successful delivery of the goods Bob would sign the transaction $TxID_7$complete with Carol, who would complete and upload it to the blockchain. The SIGHASH function AnyOneCanPay can be used to enable partial authorisation as shown in the examples below.

<table>
<tr><th colspan="6">$TxID_7$ partial</th></tr>
<tr><td>Version</td><td colspan="2">1</td><td>Locktime</td><td colspan="2">0</td></tr>
<tr><td>In-count</td><td colspan="2">3</td><td>Out-count</td><td colspan="2">2</td></tr>
<tr><td colspan="3">Input list</td><td colspan="3">Output list</td></tr>
<tr><td></td><td colspan="2">Unlocking script</td><td></td><td colspan="2">Locking script</td></tr>
<tr><td>Outpoint</td><td>Signature</td><td>Hash flag</td><td>Value</td><td>OP_PUSHDATA</td><td>P2PKH</td></tr>
<tr><td>$TxID_3$ || 1</td><td colspan="2">[Alice linkable signatures SIGHASH SINGLE|AnyOneCanPay]</td><td>x satoshi</td><td><Reference$_{SLI}$> || <service complete></td><td><P$_{Carol}$></td></tr>
<tr><td>$TxID_3$ || 2</td><td colspan="2">[Alice linkable signatures SIGHASH SINGLE|AnyOneCanPay]</td><td>x satoshi</td><td><Reference$_{PL}$> || <service complete></td><td><P$_{Carol}$></td></tr>
</table>

<table>
<tr><th colspan="6">$TxID_7$ complete</th></tr>
<tr><td>Version</td><td colspan="2">1</td><td>Locktime</td><td colspan="2">0</td></tr>
<tr><td>In-count</td><td colspan="2">3</td><td>Out-count</td><td colspan="2">2</td></tr>
<tr><td colspan="3">Input list</td><td colspan="3">Output list</td></tr>
<tr><td></td><td colspan="2">Unlocking script</td><td></td><td colspan="2">Locking script</td></tr>
<tr><td>Outpoint</td><td>Signature</td><td>Hash flag</td><td>Value</td><td>OP_PUSHDATA</td><td>P2PKH</td></tr>
<tr><td>$TxID_3$ || 1</td><td colspan="2">[Alice & Carol linkable signatures SIGHASH SINGLE|AnyOneCanPay]</td><td>x satoshi</td><td><Reference$_{SLI}$> || <service complete></td><td><P$_{Carol}$></td></tr>
<tr><td>$TxID_3$ || 2</td><td colspan="2">[Alice & Carol linkable signatures SIGHASH SINGLE|AnyOneCanPay] [Bob linkable signatures SIGHASH ALL]</td><td>x satoshi</td><td><Reference$_{PL}$> || <service complete></td><td><P$_{Carol}$></td></tr>
</table>

As mentioned above, by mapping modifications to the blockchain, a document can be traced to its current state and all modifications to the document since it was created can be tracked.

Embodiments of the technology leverage transaction verifications mechanisms used to secure the blockchain to additionally provide an additional document signature verification function. In that case, the document signatures take the form of transaction signatures for validating transactions, and in particular for validating spending relationships between transactions. This has the benefit that the existing work performed by node to validate blockchain transactions also assists in the verification of the document signature requirements. In some embodiments, the system actors (i.e. the actors signing the documents) would need to check the identity of the signer, and to check what was signed (i.e. the SIGHASH used) for example. That is a transaction can be accepted by the nodes and recorded to the blockchain although it does not conform to the known rule set for the document(s) in the transaction.

Figure 10:
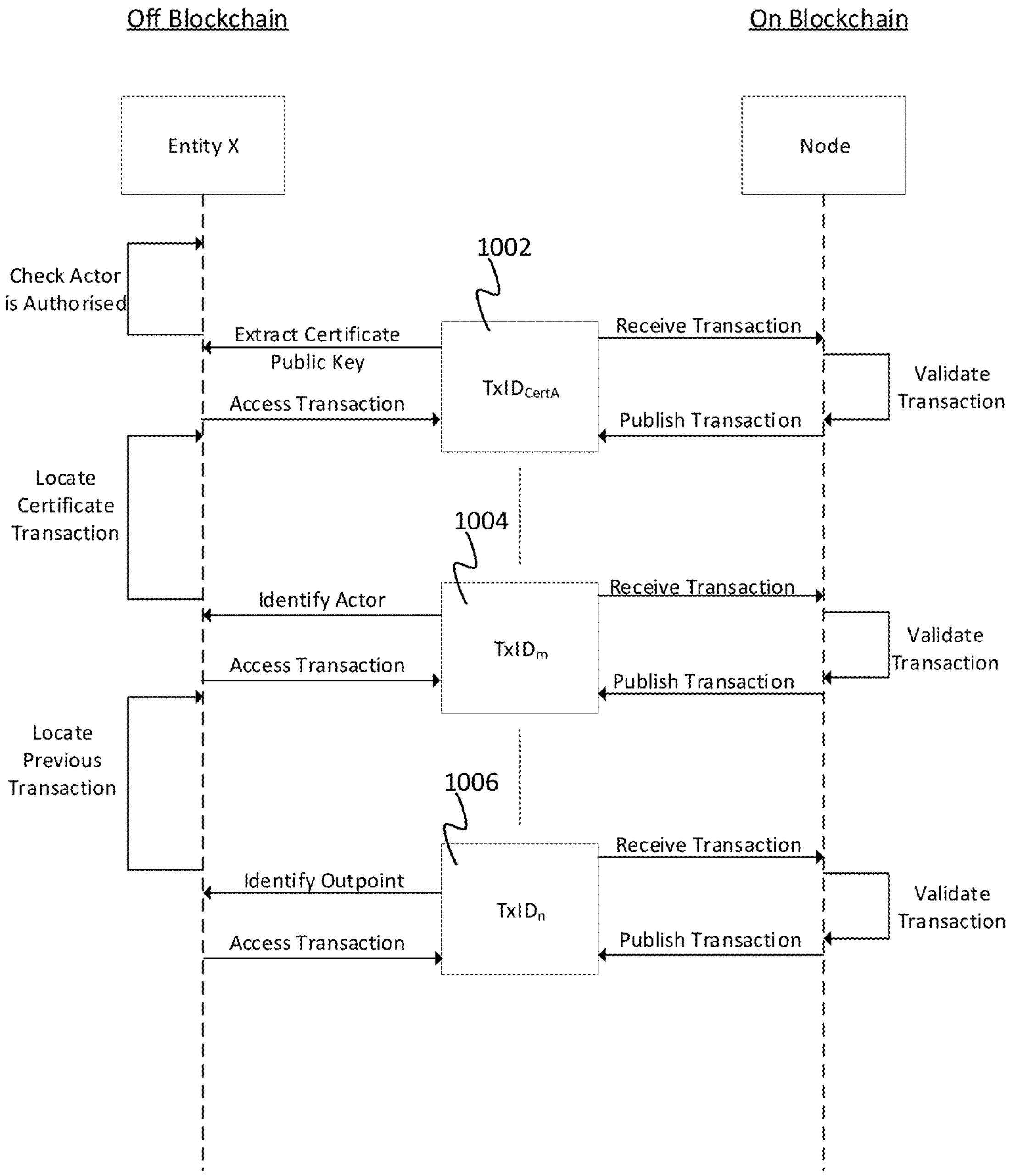

FIG. 10 illustrates how modifications can be validated both on and off the blockchain using the modification transactions 500 disclosed herein.

Each time a transaction 1002, 1004, 1006 is created, it is transmitted to a node of the blockchain, which validates the transaction and publishes it to the blockchain in a block. This process is set out in more detail above.

When validating the transaction, the node checks that the actor authorising the transaction with a signature is authorised to do so by checking the actor's signature in the transaction input with the next authorised actor identified in the output of the previous transaction, i.e. that identified by the outpoint of the transaction input.

Through this validation by blockchain nodes, it is almost impossible to use a cancelled or replaced document, forge ownership of a document, or transfer the document twice. It ensures that modifications to the documents can only be performed by authorised parties.

Since the document data is also published to the blockchain in issuing transactions, the blockchain can act as a backup for the documents.

The blockchain node, however, does not validate that the actor authorising the transaction is legally authorised to make the modification. This step is performed off the blockchain.

FIG. 10 shows Entity X, an entity external to the blockchain. To check that the current authorised actor is the legal authorised actor authorised to make a certain modification, Entity X accesses the transaction 1006 in which the modification is performed. The outpoint of the relevant input of the transaction is identified.

Entity X uses the outpoint to locate a previous transaction 1004 of which the input of transaction 1006 is a spendable output. Entity X accesses the previous transaction 1004. The identity of the actor is determined form the output of the previous transaction 1004 identified by the outpoint. That is, Entity X accesses the child public keys of the actor in the output of the previous transaction 1004.

Entity X then locates the certificate transaction 1002 of the actor who is legally authorised to make the modification. This transaction 1002 is accessed and the certificate public key extracted. Entity X can then check that the relationship between the child public keys from the transaction output and the certificate public key is met. If it is, the actor is legally authorised to make the modification.

A similar process can be performed by Entity X to track changes to a document. Entity X accesses a transaction 1006 on the blockchain. This may be a transaction with an unspent spendable output associated with the document to be tracked.

The outpoint of the input associated with the document is identified and used to locate the previous transaction 1004 of which the input is a spendable output. Entity X can access this previous transaction 1004, locate the relevant spendable output, determine the modification made to the document in the transaction 1004 by the state of the output, and determine by whom the modification was made by checking which signatures were used to authorise the transaction.

If the state is issue or create, the transaction 1004 is that in which the document was issued such that there are no other previous transactions comprising modifications to the document.

However, if the state is not issue or create, other modifications were made to the document prior to the transaction 1004. Entity X can find these other previous transactions in a similar way, by identifying the outpoint of the associated input in the transaction 1004 and then using the outpoint to locate the previous transaction in which the document was modified. This can be continued until the issuing transaction is located.

A similar process can be performed to trace the document to its current state. In this process, the spendable outputs associated with the document are followed through the blockchain until an unspent spendable output associated with the document is found. Recording the modifications of the documents to the blockchain as described herein provides a mechanism for robustly checking the state of a document.

In some embodiments, the bitcoin node or some other trusted third party may provide an extra service of enforcing rules relating to the modifications a next actor can perform on a document. Such an embodiment may be achieved by, for example, configuring all clients (or wallets) used by the actors in authorising transactions to connect to the blockchain via a gateway (a trusted server) that ensures only transaction comprising allowable modifications to go onto the blockchain. The trusted server could be another signer in the transaction, who would add his signature only when the correct flags are used, i.e. only when the actor is authorised to perform the modification signified by the flag. The clients (or wallets) used could be certified such that they adhere to the system configuration, for example use of correct flags, and to ensure that the user understands exactly what he is doing, for example what documents he is authorising and what modification he is making to the document. In some implementations, the bitcoin nodes may compare the status flag in the outpoint and the output to ensure conformity with the rules.

Although the use of linkable signatures has been described in the above description, it will be appreciated that the signer does not have to link their public key to the transaction. That is, ownership of the document can be passed anonymously. There may be rules and regulations for certain use cases which determine if such an implementation is allowable, or which have to be implemented via some other verification method when such an implementation is used.

In some embodiments, documents are inserted into the inputs of transactions as part of the unlocking script. The documents can be inserted as a pre-hash that is revealed only when spending the transaction. For example, in such an embodiment a transaction would have in its output the locking script <hashOftheDocument> and, when spending that transaction, the <Document> is inserted to unlock.

It will be appreciated that some or all of the data inserted in transactions may be in an encrypted form depending on the confidentiality requirements of the use case. It is also expected that different items may have different authorization access requirements. In such cases, the above disclosed method may be modified to provide selected access to this data. For example, it is possible also to insert the hash of the documents or NI instead of the document itself. This method would provide confidentiality as well as allow documents of any size to be inserted without conflicting with the bitcoin layer limitations. A typical insertion would have proper flags and identifiers in addition to the hash of the document. The system should be designed such that signers should always be aware of what they sign.

When the present technique is used in legal use cases such as in shipping, it is important to use up to date forms and procedures. An on blockchain export solution can help to make sure that templates used are up to date, by being in the UTXO, before getting filled. The process and documentation can all be described in the blockchain and maintained as updates take place. The actor's wallet that provides the correct interface to the blockchain can always look for up to date forms and process and guide the actor while filling forms on chain.

In the above described method, OP_PUSHDATA is used to insert data. Alternatively, OP_RETURN can also be used. An output containing OP_RETURN is necessarily invalid (unspendable), so that output would not define a signature requirement. However, the document or reference, in this case, could be contained in an unspendable output, associated with a separate spendable output defining the signature requirement.

It is also possible to have multiple outputs in a transaction for the purpose of notifying other parties (e.g. importer, bank, customs, carrier) by having their wallet addresses in the output of the transaction.

It will be appreciated that Metanet Protocol may be used as an alternative to the method set out above. An example is given below.

In the Metanet protocol, there is a directed graph formed of nodes and edges. A Node is a transaction, and an edge is an association between two nodes (i.e. transactions), where one transaction (child) contains the identifier of the other transaction (parent). Accordingly, an update to the child transaction can only be accepted if it is signed by the parent transaction secret key.

| $TxID_{node}$ | |
|---|---|
| Input | Output |
| <Sig $P_{parent}$> <$P_{parent}$> | OP_RETURN <Metanet Flag> <$P_{node}$> <$TxID_{parent}$> |

The above transaction is a Metanet transaction, where the index of the node and its parent is given by $ID_{node}=H(P_{node}\|TxID_{node})$, $ID_{parent}=H(P_{parent}\|TxID_{parent})$.

The BOL data can be inserted on the blockchain using the Metanet protocol as follows. When a shipper uses a carrier a Metanet transaction is made between both parties, signed by both of them. That could be a transaction without a parent node, a.k.a orphan transaction. $TxID_{shipping}$ below is an example.

| $TxID_{shipping}$ | | | | |
|---|---|---|---|---|
| Input | | Output | | |
| Index | Unlocking script | Index | value | Locking script |
| 0 | <Sig $P_{shipper}$> | 0 | 0 | OP_RETURN <Metanet Flag> <$P_{shipping}$> <BoL> |
| 1 | <Sig $P_{carrier}$> | 1 | change | <$P_{shipper}$> |
| | | 2 | change | <$P_{carrier}$> |

When the carrier reaches the receiver, a transaction is made between the carrier and the receiver, for example $TxID_{receiving}$ below. It may be associated to the $TxID_{shipping}$ as a child. The carrier knows $P_{shipping}$ private key.

| $TxID_{receiving}$ | | | | |
|---|---|---|---|---|
| Input | | Output | | |
| Index | Unlocking script | Index | value | Locking script |
| 0 | <Sig $P_{shipping}$> <$P_{shipping}$> | 0 | 0 | OP_RETURN <Metanet Flag> <$P_{receiving}$> <$TxID_{shipping}$> <Data> |
| 1 | <Sig $P_{receiver}$> | 1 | change | <$P_{shipper}$> |
| | | 2 | change | <$P_{carrier}$> |

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In non-preferred embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method of cryptographically linking multiple documents, having multiple electronic signature requirements, via a sequence of blockchain transactions, the method comprising: computing document signature data satisfying a first signature requirement for an existing document, the first signature requirement defined in a blockchain transaction containing or referencing the existing document; wherein the document signature data signs a portion of a linking transaction containing or referencing a supplementary document, the linking transaction comprising an input for validly spending a spendable output of the blockchain transaction, whereby the document signature cryptographically links the supplementary document with the existing document; and wherein the signed portion comprises multiple outputs of the linking transaction, wherein a first of the multiple signed outputs is spendable and associated with the existing document, the signed portion defining a second signature requirement for the existing document, and wherein a second of the multiple signed outputs is spendable and associated with the supplementary document, the signed portion defining a signature requirement for the supplementary document.

Statement 2. The method of statement 1, wherein the first signature requirement is defined in the spendable output of the blockchain transaction and must be satisfied in order to spend that spendable output, and the document signature data takes the form of transaction signature data to be included in the input of the linking transaction for validly spending the spendable output of the blockchain transaction; wherein the second signature requirement for the existing document is defined in the first spendable output and must be satisfied in order to spend the first spendable output of the linking transaction; and wherein the second signature requirement for the supplementary document is defined in the second spendable output and must be satisfied in order to spend the second spendable output of the linking transaction.

Statement 3. The method of statement 1 or statement 2, wherein at least one of the signature requirements of the linking transaction comprises at least one public key.

Statement 4. The method of statement 3, wherein the public key is verifiable from a public key certificate of a certifying transaction, the signed portion of the linking transaction identifying the certifying transaction.

Statement 5. The method of statement 4, wherein the linking transaction is directly or indirectly associated with the certifying transaction via one or more transaction spending relationships, thereby identifying the certifying transaction.

Statement 6. The method of any of statements 3 to 5, wherein the public key certifies a master public key, but the signature requirement does not require direct use of the corresponding private key, and instead comprises a transient public key and a composite public key derived from the transient public key and the master public key.

Statement 7. The method of any preceding statement, wherein the blockchain transaction comprises a first status flag associated with the existing document, and the signed portion of the linking transaction contains a second status flag associated with the existing document and a status flag associated with the supplementary document.

Statement 8. The method of any preceding claim, wherein the existing document is contained or referenced in the spendable output of the blockchain transaction; wherein the first spendable output of the linking transaction contains a reference to the existing document, and the second spendable output of the linking transaction contains data of the subsequent document.

Statement 9. The method of statement 8 when dependent on statement 7, wherein the first status flag of the existing document is contained in said spendable output of the blockchain transaction, the second status flag of the existing document is contained in the first spendable output of the linking transaction, and the status flag of the subsequent document is contained in the second spendable output of the linking transaction.

Statement 10. The method of any of statements 1 to 7, wherein the existing document is contained in an unspendable output of the blockchain transaction, wherein the signed portion of the linking transaction comprises one or more unspendable outputs containing a reference to the existing document and data of the subsequent document.

Statement 11. The method of any of statements 1 to 8, wherein data of the existing document is contained in said input of the linking transaction, so as to satisfy an existing document challenge of the spendable output of the blockchain transaction.

Statement 12. The method of statement 11 when dependent on statement 7, wherein the second status flag of the existing document is contained in said input of the linking transaction.

Statement 13. The method of any preceding statement, wherein at least one of the signature requirements of the linking transaction requires transaction signatures from multiple parties.

Statement 14. The method of any preceding statement, wherein at least one of the signature requirements of the linking transaction identifies multiple parties, but only requires transaction signatures from a subset of the identified parties.

Statement 15. The method of any preceding statement, wherein the supplementary document is a further existing document, and the linking transaction comprises a second input for validly spending a spendable output of a second blockchain transaction, the second blockchain transaction containing or referencing the further existing document; wherein said signature requirement for the further existing document is a second signature requirement for the further existing document, the method comprising: computing further document signature data satisfying a first signature requirement for the further existing document, as defined in the second blockchain transaction.

Statement 16. The method of statement 15 when dependent on statement 2, wherein the first signature requirement for the further existing document is defined in the spendable output of the second blockchain transaction, wherein the further document signature data takes the form of further transaction signature data for the second input of the linking transaction for validly spending the spendable output of the second blockchain transaction.

Statement 17. An electronic signature application for linking and signing multiple documents having multiple signature requirements, the digital signature application embodied as program instructions in non-transitory media and configured, when executed on a computer, to implement the method of any preceding statement.

Statement 18. The electronic signature application of statement 17, further configured to render a visual document signing interface for linking and signing the documents, by: using the blockchain transaction to render a visual representation of the existing document to be signed, receiving first user input denoting the supplementary document to be linked to the existing document; receiving second user input for computing the document signature data.

Statement 19. The electronic signature application of statement 18, configured to locate the blockchain transaction in a blockchain maintained by a blockchain network, and apply at least one validity check to the blockchain transaction before rendering the existing document for signing.

Statement 20. The electronic signature application of statement 19, wherein the at least one validity check comprises checking the blockchain transaction has been immutably committed to the blockchain before rendering the existing document for signing.

Statement 21. The electronic application of statement 19 or 20, configured to use the blockchain transaction to retrieve the existing document from the blockchain for rendering in the document signing interface, the existing document stored in the blockchain in encrypted or unencrypted form.

Statement 22. The electronic signature application of statement 19 or 20, configured to receive the existing document for rendering from an off-chain source, and use the blockchain transaction to verify the received existing document, the blockchain storing a copy or hash of the existing document for performing said verification.

Statement 23. The electronic signature application of any of statements 18 to 22, wherein the second user input comprises at least one private key for computing the document signature data.

Statement 24. The electronic signature application of any of statement 18 to 22, wherein the second user input comprises data for decrypting at least one private key required to compute the document signature data, the encrypted private key stored in a location accessible to the electronic signature application.

Statement 25. The electronic signature application of any of statement 17 to 24 when dependent on statement 3, configured to verify the public key against a public key certificate of a certifying transaction associated with the public key.

Statement 26. A user device comprising: one or more processors configured to implement the electronic signature application of any of claims 17 to 25; and a user interface for receiving user input.

Statement 27. A linking transaction for a blockchain, the linking transaction comprising an input for validly spending a spendable output of a blockchain transaction containing or referencing an existing document, and multiple outputs; wherein document signature data signs a portion of the linking transaction containing or referencing a supplementary document, whereby the document signature cryptographically links the supplementary document with the existing document; and wherein a signed portion comprises multiple outputs of the linking transaction; wherein a first of the multiple signed outputs is spendable and associated with the existing document, the signed portion defining a second signature requirement for the existing document, and wherein a second of the multiple signed outputs is spendable and associated with the supplementary document, the signed portion defining a signature requirement for the supplementary document.

Statement 28. A node for a blockchain network comprising one or more processors configured to verify the linking transaction of any preceding claim by checking document signature data signing the signed portion of the linking transaction satisfies the first signature requirement defined in the blockchain transaction.

Statement 29. A computer system for implementing the method of any of statement 1 to 16, the computer system comprising the user device according to statement 26 and the node according to statement 28.

According to another aspect disclosed herein, there may be provided a method comprising the actions of a signing party providing the document signature data.

Annex A

The following table provides a brief description of the main documents used in shipping and international trade.

| Document | Description | Actors |
|---|---|---|
| Shipper Letter of Instruction (SLI) | Also known as Forwarding Instructions. An SLI is a document prepared by the shipper and conveys instructions to the carrier. An SLI typically includes a limited Power of Attorney statement that gives the freight forwarder (an agent) the authority to sign documents on behalf of the shipper. It also lists what other documents included with the shipment. | The shipper or shipping agent issues the SLI. Parties who receive this document are forwarders, carriers, shipping agents, etc. |
| Commercial invoice (CI) | A formal request of reimbursement by the exporter to the importer. | Filled and signed by the exporter, and sent to the importer, insurance company, customs and banks. |
| Certificate of Origin (COO) | This certifies a country of origin of the goods. It can be a statement added to the commercial invoice that supports the listing of the country of origin by line item. Alternatively, it may be a separate letter or form.<br>Customs in some countries expect it to be signed by the exporter, the signature notarized, and the document subsequently signed and stamped by a chamber of commerce. | Issued by the exporter.<br>Usually should be endorsed by a recognized authority such as the local chamber of commerce.<br>Needed mainly by |

-continued

| Document | Description | Actors |
|---|---|---|
| | It may also be needed by the importer in the documentary requirements stated within a letter of credit. Customs authorities in many countries require the COO to help determine the admissibility of goods and the duty rate apply to imports. | custom authorities. |
| Packing list | Its purpose is to provide the exporter, the freight forwarder, and the ultimate consignee with information about the shipment, the packing details, and the marks and numbers on the outside of the boxes. It is also used as a supporting document in the event of a dispute between the carrier and the exporter regarding measurement and weight of the cargo. | Provided by the exporter |

Annex B

The commercial invoice has the following states:

Issued by the Exporter

Cancelled by the exporter

Cancelled and replaced by the exporter

Paid.

The table below illustrates how the modifications to the commercial invoice can be mapped to transactions on the blockchain.

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Issued by | Exporter | $TxID_{issue}$ (one input and one output) | Any | Exporter signature | Invoice data | Issued | P2PK or P2PKH Exporter |
| Cancelled by | Exporter | $TxID_{cancel}$ (one input and one output) | $TxID_{issue}$ Or $TxID_{replace}$ | Exporter signature | — | Cancel | Any |
| Cancelled and replaced | Exporter | $TxID_{replace}$ (one input and one output) | $TxID_{issue}$ Or $TxID_{replace}$ | Exporter signature | Invoice data | Replace | P2PK or P2PKH Exporter |
| Payment receipt | Exporter | $TxID_{paid}$ (one input and one output) | $TxID_{issue}$, $TxID_{cancel}$ $TxID_{replace}$ | Exporter signature | | Paid | P2PKH or P2PK payer |

Annex C

The packing list and shipper's letter of instructions have the following states:

Created by the shipper

Cancelled by the shipper

Cancelled and replaced by the shipper

Endorsed and accepted by the carrier or agent

Serviced by the service provider.

The table below illustrates how the modifications to the packing list and shipper's letter of instructions can be mapped to transactions on the blockchain.

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Issued and not endorsed | Issuer: Shipper | $TxID_{issue}$ (one input and one output) | Any | Shipper signature | SLI/PL data | Issue | P2PK or P2PKH Multi-sign 1 of 2 Shipper, Carrier |
| Issued and endorsed | Issuer: Shipper Endorser: Carrier | $TxID_{issue\ endorsed}$ (two inputs and one output) | Any<br>Any | Shipper signature<br>Carrier signature | SLI/PL data | Issued and endorsed | Multi-sign 2 of 2 Shipper, Carrier |

-continued

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Cancel a non-endorsed | Shipper | $TxID_{cancel}$ (one input) | $TxID_{issue}$ Or $TxID_{replace}$ | Shipper signature | — | Cancel | P2PK or P2PKH Shipper |
| Cancel and replace a non-endorsed | Shipper | $TxID_{replace}$ | $TxID_{issue}$ Or $TxID_{replace}$ | Shipper signature | SLI/PL replace data | Replace | P2PK or P2PKH Multi-sign 1 of 2 Shipper, Carrier |
| Cancel and replace an endorsed document | Issuer: Shipper Endorser: Carrier | $TxID_{replace\ endorsed}$ | $TxID_{issue\ endorsed}$ Or $TxID_{replace\ endorsed}$ | Shipper and Carrier signatures | SLI/PL data replace data | Replace and endorse | P2PK or P2PKH Shipper Multi-sign 2 of 2 Shipper, Carrier |
| Accept or endorse a non- | SLI and PL MUST be endorsed by the carrier or the agent. Endorsement can be done by adding a transaction input that is signed by the endorser. Once the SLI or PL is endorsed, cancellation or replacement should also be endorsed to be valid. | | | | | | |
| endorsed document | Carrier | $TxID_{endorse}$ | $TxID_{issue}$, Or $TxID_{replace}$ | Carrier | | Endorse | P2PK or P2PKH Multi-sign 2 of 2 Shipper and Endorser |
| Service provided completed | Shipper or its agent | $TxID_{serviced}$ | $TxID_{issue}$, Or $TxID_{replace}$ | Shipper and Carrier signatures | | Service complete | P2PKH or P2PK payer |

A transaction for an endorsed document can be spent:

1. By the entity that receives the service when the service in the endorsed document service is provided and complete
2. By the carrier and the shipper when the carrier and the shipper agree to cancel or replace the document
3. By the shipper alone when the shipper wants to cancel or replace the agreement (if this is allowed at that stage)
4. By the carrier alone when the carrier wants to cancel the agreement (if this is allowed at that stage)

Annex D

The table below illustrates how modifications to the BoL can be mapped to transactions on the blockchain.

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Issued and not endorsed yet | Issuer: Carrier | $TxID_{issue}$ (one input one output) | Any | Carrier signature | BOL data and (optionally) Shipper ID | Issued | P2PK or P2PKH Shipper |
| Issued and endorsed | Issuer: Shipper Endorser: Carrier | $TxID_{issue\ endorsed}$ (two inputs and one output) | Any<br>Any | Carrier signature<br>Shipper signature | BOL data and (optionally) Shipper ID | Issued and endorsed | P2PK or P2PKH Shipper |
| Transfer rights to the | The shipper gets paid and transfer the BOL to the payer e.g. Bank or the importer. The BOL data is for referencing. The original BOL can only be edited by the Carrier or by the both Carrier and the Shipper. | | | | | | |
| goods | Transfer or: Shipper | $TxID_{transfer}$ (one input and one output) | $TxID_{issue}$ OR $TxID_{issue\ endor}$ | Shipper (or transfer or) signature | BOL reference and (optionally) new owner ID | Transfer right | P2PK or P2PKH Transferee (new owner) |

-continued

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Release the goods | Receive the goods. The owner of the goods hands the Shipper (or its agent) the BOL and gets the goods | | | | | | |
| | Recipient: owner | $TxID_{release}$ (one input and one output) | $TxID_{transfer}$ Or $TxID_{issue}$ Or $TxID_{issue\ endor}$ | Owner signature | BOL reference | Goods delivered | P2PK or P2PKH Carrier |
| Release the goods endorsed | Delivery of the goods could also be endorsed by the Carrier or its agent. This is recorded in $TxID_{release\ endorsed}$, which has two inputs one signed by the recipient of the goods and the other input is signed by the carrier. | | | | | | |
| | Recipient: owner Endorsed: Carrier | $TxID_{release\ endors}$ (two inputs and one output) | $TxID_{transfer}$ Or $TxID_{issue}$ Or $TxID_{issue\ endor}$ | Owner signature | BOL reference | Goods delivered | P2PK or P2PKH Carrier |
| | | | Any | Carrier Signature | | | |
| Issuing a cancellable or replaceable endorsed BOL | This is an example of issuing a replaceable or cancellable endorsed BOL. Cancellation or replacement can only happen if both the shipper and the carrier sign to that. The Shipper can also transfer the ownership of the goods without the need for the carrier's signature. | | | | | | |
| | Issuer: Shipper Endorser: Carrier | $TxID_{issue\ endorsed}$ (two inputs and one output) | Any | Carrier signature | BOL data and optionally Shipper ID | Issued and endorsed | P2PKH or P2PK Shipper OR Multi sign 2 of 2 Shipper and Carrier |
| | | | Any | Shipper signature | | | |

Annex E

The certificate of origin has the following states:

Created by the exporter

Cancelled by the exporter

Cancelled and replaced by the exporter

Endorsed and authenticated by appropriate authorizing body (e.g. Chamber of Commerce).

The table below illustrates how the modifications to the certificate of origin can be mapped to transactions on the blockchain.

| | | | Transaction input | | Transaction output | | |
|---|---|---|---|---|---|---|---|
| Action | Actor | Mapped to transaction | Spent transaction | Unlocking script | Inserted data | Inserted flag | Locking script |
| Issued and not endorsed yet | Issuer: Exporter | $TxID_{issue}$ (one input one output) | Any | Exporter signature | Certificate of Origin data | Issued | P2PK or P2PKH Chamber of Commerce |
| Endorse an issued COO | Endorser: Chamber of Commerce | $TxID_{issue\ endorse}$ (one input and one output) | $TxID_{issue}$ | Chamber of Commerce signature | Certificate of Origin reference | Issued and endorsed | P2PK or P2PKH Shipper |
| | | The shipper gets paid and transfer the BOL to the payer e.g. Bank or the importer. The BOL data is for referencing. The original BOL can only be edited by the Carrier or by the both Carrier and the Shipper. | | | | | |
| Issued and endorsed | Issuer: Exporter Endorser: Chamber of Commerce | $TxID_{issue\ endorsed}$ (two inputs and one output) | Any | Exporter signature | Certificate of Origin data | Issued and endorsed | Multi-sign 2 of 2 Exporter and Chamber of Commerce |
| | | | Any | Chamber of Commerce signature | | | |

The invention claimed is:

1. A computer-implemented method of cryptographically linking multiple documents, having multiple electronic signature requirements, via a sequence of blockchain transactions, the method comprising:

obtaining a blockchain transaction containing or referencing an existing document and defining a first signature requirement for the existing document;

obtaining a linking transaction, wherein the linking transaction comprises an input for validly spending a spendable output of the blockchain transaction and multiple outputs, wherein a first of the multiple outputs is spendable and associated with the existing document and defines a second signature requirement for the existing document, wherein a second of the multiple outputs is spendable and associated with a supplementary document and defines a signature requirement for the supplementary document; and cryptographically signing a portion of the linking transaction containing or referencing the supplementary document to compute document signature data satisfying the first signature requirement, the signed portion comprising the multiple outputs of the linking transaction, whereby the document signature cryptographically links the supplementary document with the existing document.

2. The method of claim 1, wherein the first signature requirement is defined in the spendable output of the blockchain transaction and must be satisfied in order to spend that spendable output, and the document signature data takes the form of transaction signature data to be included in the input of the linking transaction for validly spending the spendable output of the blockchain transaction;

wherein the second signature requirement for the existing document is defined in the first spendable output and must be satisfied in order to spend the first spendable output of the linking transaction; and wherein the second signature requirement for the supplementary document is defined in the second spendable output and must be satisfied in order to spend the second spendable output of the linking transaction.

3. The method of claim 1, wherein at least one of the signature requirements of the linking transaction comprises at least one public key.

4. The method of claim 3, wherein the public key is verifiable from a public key certificate of a certifying transaction, the signed portion of the linking transaction identifying the certifying transaction.

5. The method of claim 4, wherein the linking transaction is directly or indirectly associated with the certifying transaction via one or more transaction spending relationships, thereby identifying the certifying transaction.

6. The method of claim 3, wherein the public key certifies a master public key, but the signature requirement does not require direct use of a corresponding private key, and instead comprises a transient public key and a composite public key derived from the transient public key and the master public key.

7. The method of claim 1, wherein the blockchain transaction comprises a first status flag associated with the existing document, and the signed portion of the linking transaction contains a second status flag associated with the existing document and a status flag associated with the supplementary document.

8. The method of claim 1, wherein the existing document is contained or referenced in the spendable output of the blockchain transaction;

wherein the first spendable output of the linking transaction contains a reference to the existing document, and the second spendable output of the linking transaction contains data of a subsequent document.

9. The method of claim 1, wherein the existing document is contained in an unspendable output of the blockchain transaction, wherein the signed portion of the linking transaction comprises one or more unspendable outputs containing a reference to the existing document and data of a subsequent document.

10. The method of claim 1, wherein at least one of the signature requirements of the linking transaction requires transaction signatures from multiple parties.

11. The method of claim 1, wherein at least one of the signature requirements of the linking transaction identifies multiple parties, but only requires transaction signatures from a subset of the identified parties.

12. The method of claim 1, wherein the supplementary document is a further existing document, and the linking transaction comprises a second input for validly spending a spendable output of a second blockchain transaction, the second blockchain transaction containing or referencing the further existing document;

wherein said signature requirement for the further existing document is a second signature requirement for the further existing document, the method comprising:

computing further document signature data satisfying a first signature requirement for the further existing document, as defined in the second blockchain transaction.

13. Anon-transitory media storing an electronic signature application for linking and signing multiple documents having multiple signature requirements via a sequence of blockchain transactions, the electronic signature application embodied as program instructions and configured, when executed on a computer, to cause the computer to implement a method of:

obtaining a blockchain transaction containing or referencing an existing document and defining a first signature requirement for the existing document;

obtaining a linking transaction, wherein the linking transaction comprises an input for validly spending a spendable output of the blockchain transaction and multiple outputs, wherein a first of the multiple outputs is spendable and associated with the existing document and defines a second signature requirement for the existing document, wherein a second of the multiple outputs is spendable and associated with a supplementary document and defines a signature requirement for the supplementary document; and cryptographically signing a portion of the linking transaction containing or referencing the supplementary document to compute document signature data satisfying the first signature requirement, the signed portion comprising the multiple outputs of the linking transaction, whereby the document signature cryptographically links the supplementary document with the existing document.

14. The electronic signature application of claim 13, further configured to render a visual document signing interface for linking and signing the documents, by:

using the blockchain transaction to render a visual representation of the existing document to be signed, receiving first user input denoting the supplementary document to be linked to the existing document;

receiving second user input for computing the document signature data.

15. The electronic signature application of claim 14, configured to locate the blockchain transaction in a blockchain maintained by a blockchain network, and apply at least one validity check to the blockchain transaction before rendering the existing document for signing.

16. The electronic signature application of claim 15, wherein the at least one validity check comprises checking the blockchain transaction has been immutably committed to the blockchain before rendering the existing document for signing.

17. The electronic application of claim 15, configured to use the blockchain transaction to retrieve the existing document from the blockchain for rendering in the document signing interface, the existing document stored in the blockchain in encrypted or unencrypted form.

18. The electronic signature application of claim 15, configured to receive the existing document for rendering from an off-chain source, and use the blockchain transaction to verify the received existing document, the blockchain storing a copy or hash of the existing document for performing said verification.

19. The electronic signature application of claim 14, wherein the second user input comprises at least one private key for computing the document signature data.

20. The electronic signature application of claims 14, wherein the second user input comprises data for decrypting at least one encrypted private key to determine a private key value required to compute the document signature data, the encrypted private key stored in a location accessible to the electronic signature application.

* * * * *